US012621444B2

(12) United States Patent
Zhang et al.

(10) Patent No.: US 12,621,444 B2
(45) Date of Patent: May 5, 2026

(54) LOOP FILTERING, VIDEO ENCODING, AND VIDEO DECODING METHODS AND APPARATUS, STORAGE MEDIUM, AND ELECTRONIC DEVICE

(71) Applicant: Tencent Technology (Shenzhen) Company Limited, Shenzhen (CN)

(72) Inventors: Han Zhang, Shenzhen (CN); Hongbin Zhang, Shenzhen (CN); Wei Kuang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 38 days.

(21) Appl. No.: 18/498,611

(22) Filed: Oct. 31, 2023

(65) Prior Publication Data

US 2024/0064298 A1 Feb. 22, 2024

Related U.S. Application Data

(63) Continuation of application No. PCT/CN2022/137908, filed on Dec. 9, 2022.

(30) Foreign Application Priority Data

Jan. 7, 2022 (CN) .......................... 202210017814.0

(51) Int. Cl.
*H04N 19/117* (2014.01)
*H04N 19/147* (2014.01)
(Continued)

(52) U.S. Cl.
CPC ......... *H04N 19/117* (2014.11); *H04N 19/147* (2014.11); *H04N 19/176* (2014.11);
(Continued)

(58) Field of Classification Search
CPC .. H04N 19/117; H04N 19/147; H04N 19/172; H04N 19/176; H04N 19/186;
(Continued)

(56) References Cited

U.S. PATENT DOCUMENTS

2021/0067793 A1* 3/2021 Hu ........................ H04N 19/176
2021/0084295 A1* 3/2021 Chen ...................... H04N 19/70
(Continued)

FOREIGN PATENT DOCUMENTS

CN 112543335 A 3/2021
CN 113615189 A 11/2021
(Continued)

OTHER PUBLICATIONS

International Search Report for PCT/CN2022/137908 dated Mar. 3, 2023.
(Continued)

*Primary Examiner* — Md N Haque
(74) *Attorney, Agent, or Firm* — Sughrue Mion, PLLC

(57) ABSTRACT

A loop filtering method, a video coding and decoding method and apparatus, a medium, and an electronic device that can obtain block classification information of a luma component in a video image frame in a case that adaptive loop filtering is performed (S710), use the block the block classification information to determine block classification information of a chroma component in the video image frame in a case that cross-component adaptive loop filtering is performed (S720); and select a corresponding filter coefficient to perform cross-component adaptive loop filtering on the chroma component according to the block classification information of the chroma component.

20 Claims, 9 Drawing Sheets

$(x_C, y_C)$

● Luma support

⬤ Chroma sample (x, y)

(51) Int. Cl.

| | |
|---|---|
| *H04N 19/176* | (2014.01) |
| *H04N 19/186* | (2014.01) |
| *H04N 19/46* | (2014.01) |
| *H04N 19/60* | (2014.01) |
| *H04N 19/82* | (2014.01) |
| *H04N 19/172* | (2014.01) |

(52) U.S. Cl.

CPC ........... *H04N 19/186* (2014.11); *H04N 19/46* (2014.11); *H04N 19/60* (2014.11); *H04N 19/82* (2014.11); *H04N 19/172* (2014.11)

(58) Field of Classification Search

CPC ........ H04N 19/46; H04N 19/60; H04N 19/61; H04N 19/70; H04N 19/82

See application file for complete search history.

(56) References Cited

U.S. PATENT DOCUMENTS

| | | | | |
|---|---|---|---|---|
| 2021/0084340 A1* | 3/2021 | Li | ........................... | H04N 19/82 |
| 2021/0092368 A1* | 3/2021 | Du | ........................... | H04N 19/46 |
| 2021/0152841 A1* | 5/2021 | Hu | ........................... | H04N 19/44 |
| 2021/0360238 A1* | 11/2021 | Chen | ................... | H04N 19/167 |

FOREIGN PATENT DOCUMENTS

| | | |
|---|---|---|
| WO | 2021/021590 A1 | 2/2021 |
| WO | 2021/083258 A1 | 5/2021 |
| WO | 2021/083259 A1 | 5/2021 |
| WO | 2021/101345 A1 | 5/2021 |

OTHER PUBLICATIONS

Written Opinion for PCT/CN2022/137908 dated Mar. 3, 2023.

European Search Report dated Jun. 10, 2025 in Application No. 22918349.6.

Marta Karczewicz, VVC In-Loop Filters, Oct. 10, 2021, IEEE Transactions on Circuits and Systems for Video Technology, vol. 31, pp. 1-19.

\* cited by examiner

Transform & Quantization

Entropy coding

Inverse quantization & Inverse transform

Prediction

Intra-frame prediction

Inter-frame prediction

Motion estimation

Loop filtering

Deblocking filter

Sample adaptive offset

ALF, CC-ALF

Decoded image buffer

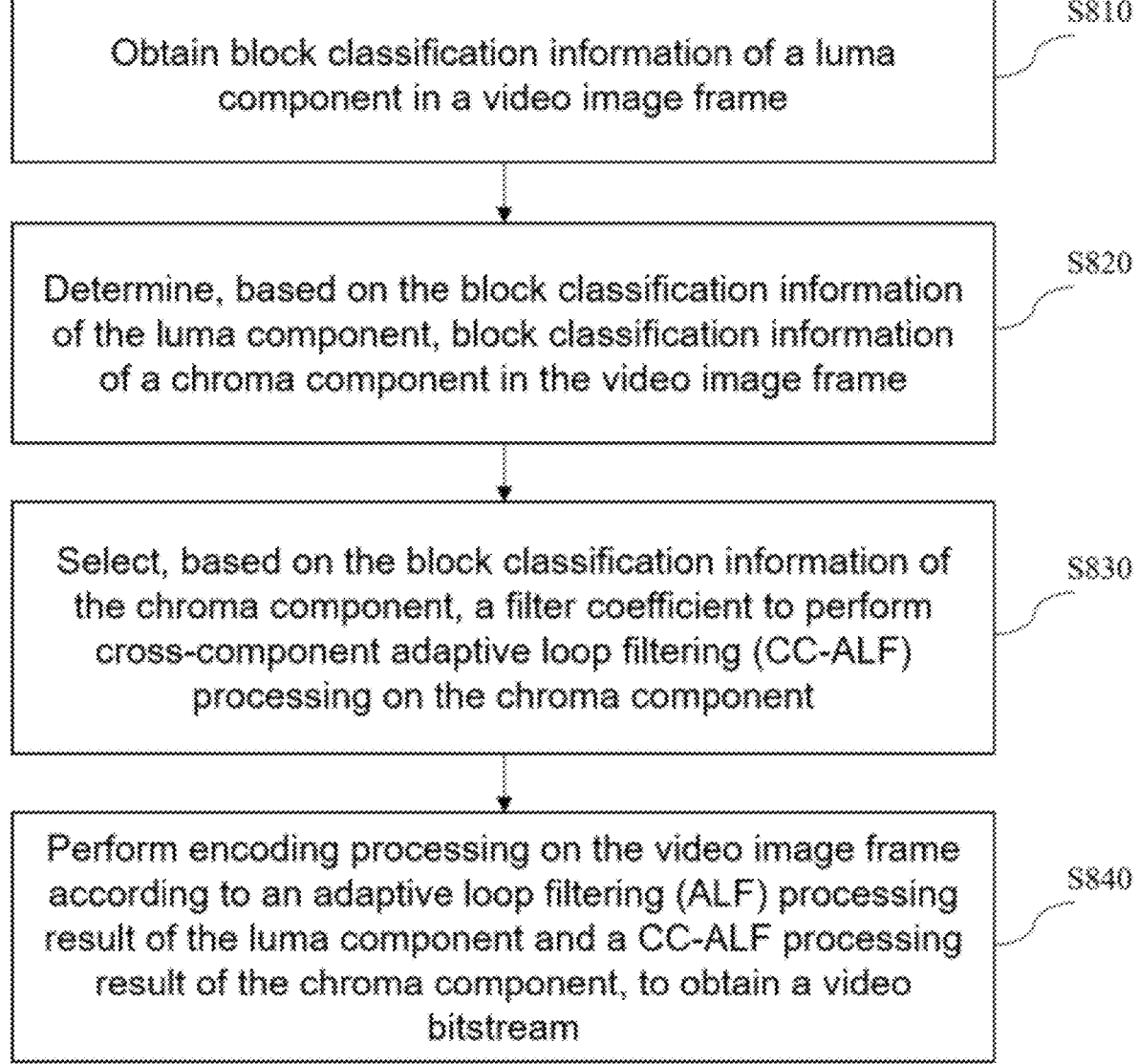

Obtain block classification information of a luma component in a video image frame

S810

Determine, based on the block classification information of the luma component, block classification information of a chroma component in the video image frame

S820

Select, based on the block classification information of the chroma component, a filter coefficient to perform cross-component adaptive loop filtering (CC-ALF) processing on the chroma component

S830

Perform encoding processing on the video image frame according to an adaptive loop filtering (ALF) processing result of the luma component and a CC-ALF processing result of the chroma component, to obtain a video bitstream

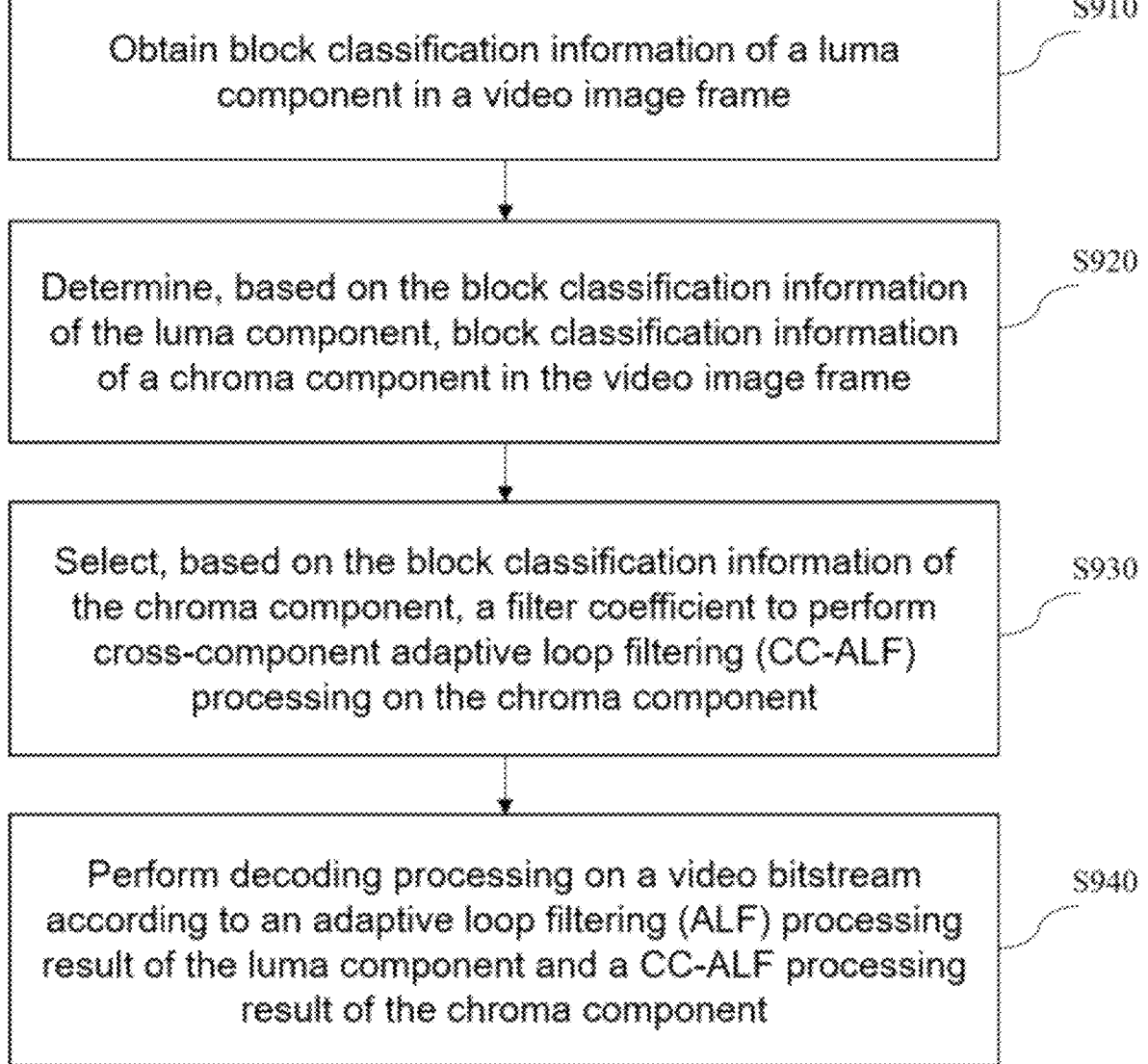

Obtain block classification information of a luma component in a video image frame    S910

Determine, based on the block classification information of the luma component, block classification information of a chroma component in the video image frame    S920

Select, based on the block classification information of the chroma component, a filter coefficient to perform cross-component adaptive loop filtering (CC-ALF) processing on the chroma component    S930

Perform decoding processing on a video bitstream according to an adaptive loop filtering (ALF) processing result of the luma component and a CC-ALF processing result of the chroma component    S940

LOOP FILTERING, VIDEO ENCODING, AND VIDEO DECODING METHODS AND APPARATUS, STORAGE MEDIUM, AND ELECTRONIC DEVICE

CROSS REFERENCE TO RELATED APPLICATION

This application is a continuation of International Patent Application No. PCT/CN2022/137908 filed on Dec. 9, 2022, which claims priority to Chinese Patent Application No. 202210017814.0, filed with the China National Intellectual Property Administration on Jan. 7, 2022, the disclosures of which are incorporated herein by reference in their entireties.

FIELD

The disclosure relates to the field of computer and communication technologies, and specifically, to loop filtering, video encoding, and video decoding methods and apparatuses, a storage medium, and an electronic device.

BACKGROUND

Cross-component adaptive loop filtering (CC-ALF) is a Wiener filter that adaptively generates and uses different filter coefficients according to a characteristic of video content (such as a game video or an online conference video).

In a current CC-ALF design, a filter coefficient needs to be adaptively selected by means of classification. However, a problem of low classification accuracy often exists, which causes poor performance in CC-ALF.

SUMMARY

According to various embodiments of the present disclosure, loop filtering, video encoding, and video decoding methods and apparatuses, a medium, and an electronic device, are provided.

According to some embodiments, a loop filtering method may be provided. The method may be performed by a video encoding device or a video decoding device, and may include: obtaining block classification information of a luma component in a video image frame; determining, based on the block classification information of the luma component, block classification information of a chroma component in the video image frame; and selecting, based on the block classification information of the chroma component, a filter coefficient to perform cross-component adaptive loop filtering (CC-ALF) processing on the chroma component. According to embodiments, the method may further include: performing decoding processing on a video bitstream according to an ALF processing result of the luma component and a CC-ALF processing result of the chroma component. Further, the method may further include: performing encoding processing on the video image frame according to an ALF processing result of the luma component and a CC-ALF processing result of the chroma component, to obtain a video bitstream.

According to some embodiments, an apparatus may be provided. The apparatus may comprise at least one memory and at least one processor. The at least one memory may be configured to store computer readable instructions and the at least one processor may be configured to access the at least one memory and execute the computer readable instructions to: obtain block classification information of a luma component in a video image frame; determine, based on the block classification information of the luma component, block classification information of a chroma component in the video image frame; and select, based on the block classification information of the chroma component, a filter coefficient to perform cross-component adaptive loop filtering (CC-ALF) processing on the chroma component.

According to some embodiments, a non-transitory computer readable medium may be provided. The non-transitory computer readable medium may store computer program code, and the program code may be configured to cause at least one processor to: obtain block classification information of a luma component in a video image frame; determine, based on the block classification information of the luma component, block classification information of a chroma component in the video image frame; and select, based on the block classification information of the chroma component, a filter coefficient to perform cross-component adaptive loop filtering (CC-ALF) processing on the chroma component.

According to some embodiments, a video decoding method may be provided. The video decoding method may be performed by a video decoding device, and may include: obtaining block classification information of a luma component in a video image frame; determining, based on the block classification information of the luma component, block classification information of a chroma component in the video image frame; selecting, based on the block classification information of the chroma component, a filter coefficient to perform cross-component adaptive loop filtering (CC-ALF) processing on the chroma component; and performing decoding processing on a video bitstream according to an adaptive loop filtering (ALF) processing result of the luma component and a CC-ALF processing result of the chroma component.

According to some embodiments, a video encoding method may be provided. The video encoding method may be performed by a video encoding device, and may include: obtaining block classification information of a luma component in a video image frame; determining, based on the block classification information of the luma component, block classification information of a chroma component in the video image frame; selecting, based on the block classification information of the chroma component, a filter coefficient to perform cross-component adaptive loop filtering (CC-ALF) processing on the chroma component; and performing coding processing on the video image frame according to an adaptive loop filtering (ALF) processing result of the luma component and a (CC-ALF) processing result of the chroma component, to obtain a video bitstream.

According to some embodiments, a loop filtering apparatus may be provided. The loop filtering apparatus may include: an obtaining unit configured to obtain block classification information of a luma component in a video image frame; a determining unit configured to determine, based on the block classification information of the luma component, block classification information of a chroma component in the video image frame; and a filtering unit configured to select, based on the block classification information of the chroma component, a filter coefficient to perform cross-component adaptive loop filtering (CC-ALF) processing on the chroma component.

According to some embodiments, a video decoding apparatus may be provided. The video decoding apparatus may include: an obtaining unit configured to obtain block classification information of a luma component; a determining unit configured to determine, based on the block classification information of the luma component, block classification information of a chroma component in the video image frame; a filtering unit configured to select, based on the block classification information of the chroma component, a filter coefficient to perform cross-component adaptive loop filtering (CC-ALF) processing on the chroma component; and a first processing unit configured to perform decoding processing on a video bitstream according to an adaptive loop filtering (ALF) processing result of the luma component and a CC-ALF processing result of the chroma component.

According to some embodiments, a video encoding apparatus may be provided. The video encoding apparatus may include: an obtaining unit configured to obtain block classification information of a luma component in a video image frame; a determining unit configured to determine, based on the block classification information of the luma component, block classification information of a chroma component in the video image frame; a filtering unit configured to select, based on the block classification information of the chroma component, a filter coefficient to perform cross-component adaptive loop filtering (CC-ALF) processing on the chroma component; and a second processing unit configured to perform encoding processing on the video image frame according to an adaptive loop filtering (ALF) processing result of the luma component and a CC-ALF processing result of the chroma component, to obtain a video bitstream.

According to some embodiments, an electronic device may be provided. The electronic device may include a memory and a processor, the memory may store computer readable instructions, and the processor may implement the method described in the foregoing embodiments when executing the computer readable instructions.

According to some embodiments, a computer storage medium may be provided. The computer readable storage medium may store computer readable instructions, and the computer readable instructions may be executed by a processor to perform the methods described in the foregoing embodiments.

According to some embodiments, a computer program product may be provided. The computer program product may include computer readable instructions, and the computer readable instructions may be executed by a processor to perform the methods described in the foregoing embodiments.

Details of one or more embodiments of the present disclosure are provided in the accompanying drawings and descriptions below. Other features, objectives, and advantages of example embodiments of the present disclosure may be apparent from the specification, the accompanying drawings, and the claims.

BRIEF DESCRIPTION OF THE DRAWINGS

To describe technical solutions in embodiments more clearly, the following briefly introduces the accompanying drawings for describing some embodiments. The accompanying drawings in the following description show only some embodiments, and a person of ordinary skill in the art may still derive other drawings from the accompanying drawings without creative efforts.

FIG. 8 illustrates a flowchart of an example video coding method, according to some embodiments.

FIG. 9 illustrates a flowchart of an example video decoding method, according to some embodiments.

DESCRIPTION OF EMBODIMENTS

Several example embodiments of the present disclosure are described in the following with reference to the accompanying drawings. Apparently, the described embodiments are merely some example embodiments, rather than all of the embodiments of the present disclosure. All other embodiments which may be obtained by a person of ordinary skill in the art based on the described embodiments without making creative efforts shall fall within the scope of the present disclosure.

In addition, the described features, structures or characteristics in the present disclosure may be merged in one or more embodiments in any appropriate manner. The following description may have many specific details, so that the example embodiments of can be fully understood. However, a person skilled in the art is to realize that, during implementing of the example embodiments of the present disclosure, not all the described detailed features may be required, and one or more features may be omitted, or another method, element, apparatus, step, or the like may be used.

The block diagrams illustrated in the accompanying drawings are merely functional entities and do not necessarily correspond to physically independent entities. That is, the functional entities may be implemented in a software form, in one or more hardware modules or integrated circuits, or in different networks and/or processor apparatuses and/or microcontroller apparatuses.

The flowcharts illustrated in the accompanying drawings are merely exemplary descriptions and do not necessarily include all content and operations/steps and do not necessarily perform in the described orders. For example, some operations/steps may be further divided, while some operations/steps may be merged or partially merged. Therefore, an actual execution order may change according to an actual use case.

"Plurality of", as mentioned in the specification means two or more. "And/or" describes an association relationship of an associated object, indicating that three relationships may exist. For example, A and/or B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects before and after the character, unless otherwise noted or the context suggests otherwise.

Figure 1:
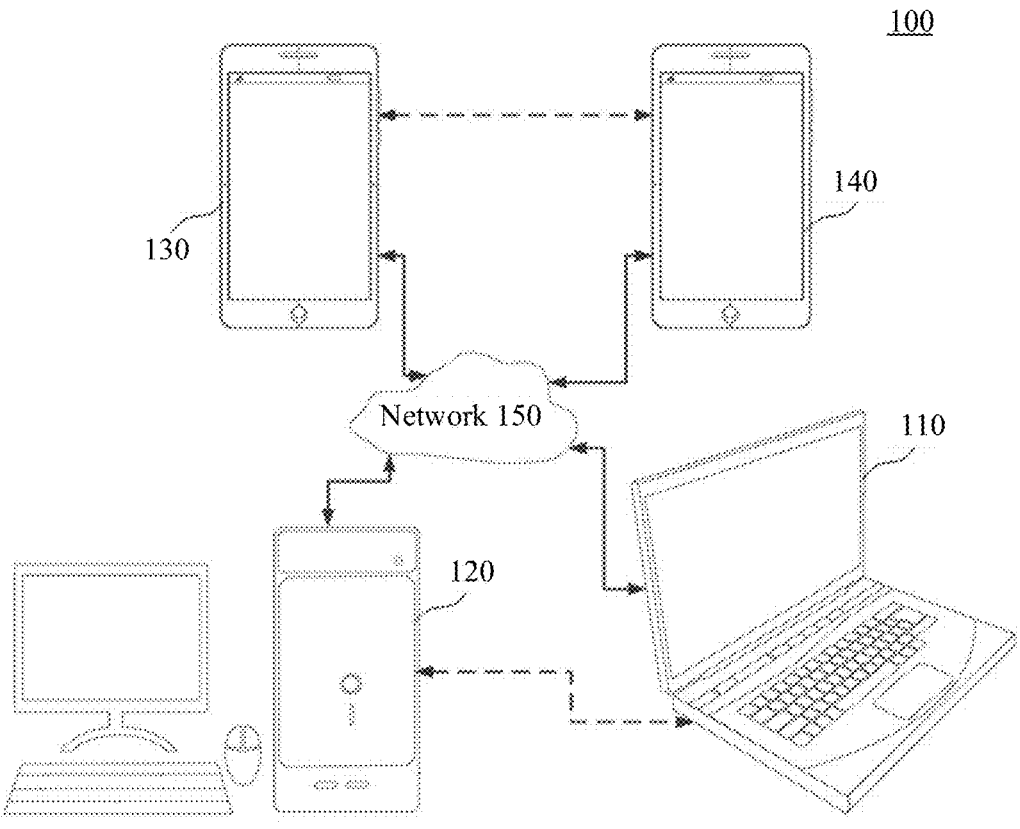
FIG. 1 illustrates a schematic diagram of an exemplary system architecture that can be applied to some embodiments.

FIG. 1 illustrates a schematic diagram of an exemplary system architecture that can be applied to some embodiments.

As shown in FIG. 1, a system architecture 100 may include a plurality of terminal apparatuses that may communicate with each other by using, for example, a network 150. For example, the system architecture 100 may include a first terminal apparatus 110 and a second terminal apparatus 120 that are interconnected by using the network 150. In the embodiment of FIG. 1, the first terminal apparatus 110 and the second terminal apparatus 120 may perform unidirectional data transmission.

For example, the first terminal apparatus 110 may encode video data (for example, a video picture stream collected by the terminal apparatus 110) to be transmitted to the second terminal apparatus 120 by using the network 150. The encoded video data is transmitted in one or more encoded video bitstreams. The second terminal apparatus 120 may receive the encoded video data from the network 150, decode the encoded video data to recover the video data, and display the video picture according to the recovered video data.

In some embodiments, the system architecture 100 may include a third terminal apparatus 130 and a fourth terminal apparatus 140 that may perform bidirectional transmission of encoded video data, where the bidirectional transmission may occur, for example, during a video conference. For bidirectional data transmission, each terminal apparatus in the third terminal apparatus 130 and the fourth terminal apparatus 140 may encode video data (for example, a video picture stream collected by the terminal apparatus), so as to transmit the video data to the other terminal apparatus in the third terminal apparatus 130 and the fourth terminal apparatus 140 by using the network 150. Each terminal apparatus in the third terminal apparatus 130 and the fourth terminal apparatus 140 may further receive the encoded video data transmitted by the other terminal apparatus in the third terminal apparatus 130 and the fourth terminal apparatus 140, decode the encoded video data to recover the video data, and display the video picture on an accessible display apparatus according to the recovered video data.

In the embodiment of FIG. 1, one or more of the first terminal apparatus 110, the second terminal apparatus 120, the third terminal apparatus 130, and the fourth terminal apparatus 140 may be servers or terminals. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart sound box, a smartwatch, an intelligent voice interaction device, a smart home appliance, an in-vehicle terminal, an aircraft, or the like, but is not limited thereto.

The network 150 may represent any quantity of networks that transmit encoded video data among the first terminal apparatus 110, the second terminal apparatus 120, the third terminal apparatus 130, and the fourth terminal apparatus 140. For instance, the network 150 may include a wired communication network and/or a wireless communication network. The communication network 150 may exchange data in circuit-switched and/or packet-switched channels. The network may include a telecommunication network, a local area network, a wide area network, and/or the Internet. The architecture and topology of the network 150 may be utilized in one or more operations disclosed in the present disclosure unless described otherwise.

Figure 2:
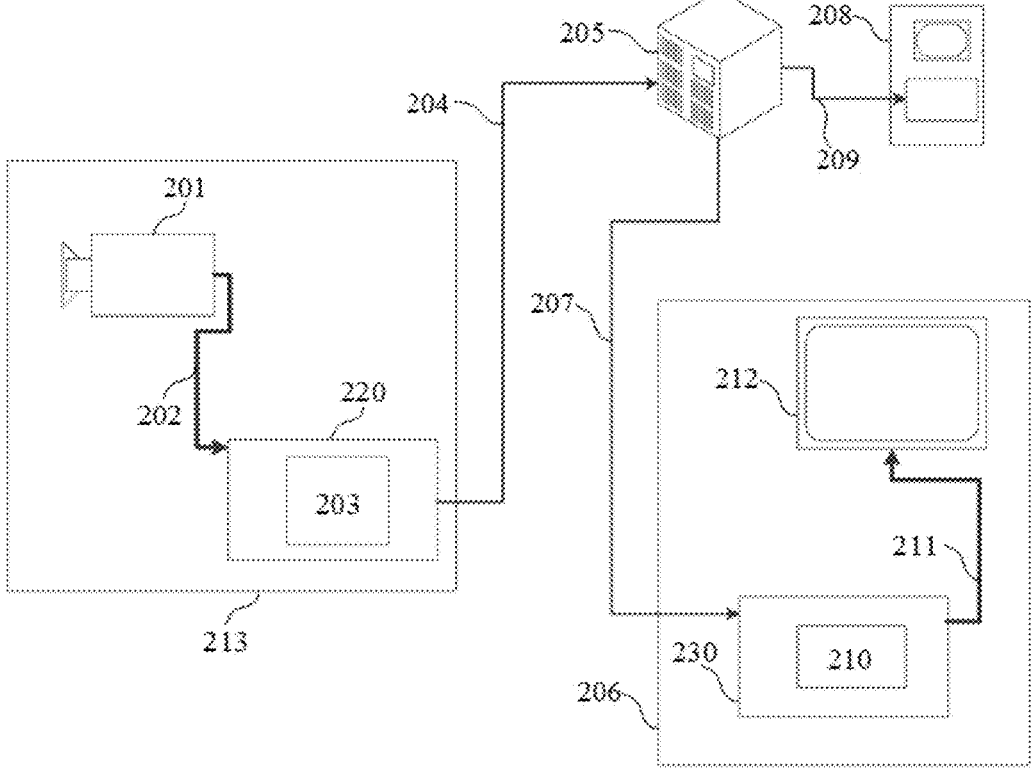
FIG. 2 illustrates an example configuration of a video encoding apparatus and a video decoding apparatus in a streaming system, according to some embodiments.

FIG. 2 illustrates an exemplary configuration of a video encoding apparatus and a video decoding apparatus in a streaming environment, according to some embodiments. The subject matter of the present disclosure may be equally applicable to any suitable video-enabled application, including, for example, a video conference, a digital television (TV), and storing a compressed video on a digital medium that may include a CD, a DVD, a memory stick, and the like.

The streaming environment may include a collection subsystem 213. The collection subsystem 213 may include a video source 201 such as a digital camera and the like. The video source may create an uncompressed video picture stream 202. In some embodiments, the video picture stream 202 may include a sample photographed by the video source 201 (e.g., digital camera, etc.) Compared with encoded video data 204 (or an encoded video bitstream 204), the video picture stream 202 is depicted as a thick line in FIG. 2 to emphasize a higher data volume of the video picture stream 202. According to some embodiments, the video picture stream 202 may be processed by an electronic apparatus 220, where the electronic apparatus 220 may include a video encoding apparatus 203 coupled to the video source 201. The video encoding apparatus 203 may include hardware, software, or a combination of software and hardware to implement or conduct aspects of the disclosed subject matter as described in more detail below. Compared with the video picture stream 202, the encoded video data 204 (or the encoded video bitstream 204) is depicted as a thin line in FIG. 2 to emphasize a lower data volume of the encoded video data 204 (or the encoded video bitstream 204). According to some embodiments, the encoded video data 204 (or the encoded video bitstream 204) may be stored on a streaming server 205 for future use. One or more streaming client subsystems, such as a client subsystem 206 and a client subsystem 208 in FIG. 2, may access the streaming server 205 to retrieve a copy 207 and a copy 209 of the encoded video data 204. The client subsystem 206 may include, for example, an electronic apparatus 230 and a video decoding apparatus 210 included in the electronic apparatus 230. The video decoding apparatus 210 may decode the incoming copy 207 of the encoded video data and generates an output video picture stream 211 that may be presented on a display 212 (e.g., a display screen) or another presentation apparatus. In some embodiments, the encoded video data 204, the video data 207, and the video data 209 (e.g., video bitstreams) may be encoded according to one or more video coding/compression standards.

It can be understood that the electronic apparatus 220 and the electronic apparatus 230 may include other components not shown in the figure. For example, the electronic apparatus 220 may further include a video decoding apparatus, and the electronic apparatus 230 may further include a video encoding apparatus, without departing from the scope of the present disclosure.

In some embodiments, one or more international video coding/encoding standards such as High Efficiency Video Coding (HEVC) and Versatile Video Coding (VVC), and one or more Chinese national video coding/encoding standards such as Audio Video Coding Standard (AVS), are used as examples herein. According to some embodiments, one video frame image may be divided into several non-overlapping processing units according to a block size, and a similar operation (e.g., compression operation, etc.) may be performed on each processing unit. This processing unit may be referred to as a Coding Tree Unit (CTU), or may be referred to as a largest coding unit (LCU). The CTU may be further divided into one or more basic coding units (CU), wherein the CU may be a most basic element in a processing phase (e.g., an encoding phase, etc.)

Descriptions associated with exemplary operations for processing the CU are provided in the following.

Predictive coding: Predictive coding may include several predictive coding modes, such as intra-frame prediction and inter-frame prediction. For instance, after a selected reconstructed video signal is used for performing prediction on an original video signal, a residual video signal is obtained. An encoder needs to determine which predictive coding mode to select for a current CU and notify a decoder regarding the same. In this regard, intra-frame prediction means that a predicted signal is obtained from an area that has been coded/encoded and is reconstructed in the same image. On the other hand, inter-frame prediction means that a predicted signal is obtained from another image that has been coded/encoded and is different from a current image (may be referred to as a reference image).

Transform & Quantization: After a transform operation (e.g., discrete Fourier transform (DFT), discrete cosine transform (DCT), etc.) is performed, a residual video signal may be converted from signal into a transform field, which may be referred to as a transform coefficient. The transform coefficient may be used for performing a lossy quantization operation to lose some information, so that a quantized signal facilitates compression expression. In some video coding/encoding standards, there may be more than one transform manner or type to be selected. Therefore, the encoder also needs to select one of the transform manners for the current CU and notify the decoder regarding the same. A degree of precision of quantization is usually determined by a quantization parameter (QP). A larger value of the QP indicates that a coefficient of a larger value range is quantized to the same output, and may thus result in a larger distortion and a lower bit rate. Conversely, when the value of the QP is relatively small, a coefficient indicating a relatively small value range is quantized to the same output, and may thus result in a relatively small distortion and a relatively high bit rate.

Entropy coding or statistical coding: A quantized transform field signal may subject to statistical compression encoding according to an appearance frequency of each associated value, and a binary (0 or 1) compressed bitstream may be outputted accordingly. In addition, entropy coding may also need to be performed on other information which is generated through encoding (e.g., a selected coding mode, motion vector data, etc.) to reduce a bit rate. Statistical coding is a lossless coding, and a bit rate required for expressing the same signal can be effectively reduced.

Common statistical coding may include variable length coding (VLC) or content adaptive binary arithmetic coding (CABAC).

A CABAC mainly includes three operations: binarization, context modeling, and binary arithmetic coding. After binarization operation is performed on an inputted syntax element, binary data may be encoded by using a conventional coding mode and a bypass coding mode. The bypass coding mode does not need to allocate a specific probability model for each binary bit, and an inputted binary bit bin value is encoded directly with a simple bypass coder to accelerate the processes of encoding and decoding. Generally, different syntax elements are not completely independent of each other, and the same syntax element may have a specific memory. Therefore, according to the conditional entropy theory, conditional coding may be performed by using another encoded syntax element, and encoding performance can be further improved as compared to independent coding or memoryless coding. These encoded symbol information which is used as a condition may be referred to as a context. In a conventional coding mode, binary bits of a syntax element may be sequentially inputted to a context modeler, and the encoder may allocate a suitable probability model for each inputted binary bit according to a value of a previously encoded syntax element or binary bit. This process may be referred to as context modeling. A context model corresponding to a syntax element may be located by using a context index increment (ctxIdxInc) and a context index Start (ctxIdxStart). After the bin value and the allocated probability model are sent together to a binary arithmetic encoder for coding/encoding, the context model needs to be updated according to the bin value. This process may be referred to as an adaptive process in encoding.

Loop filtering: A changed and quantized signal may be used for obtaining a reconstructed image through operations like inverse quantization, inverse transform, and prediction compensation. Compared with an original image, some information of the reconstructed image may be different from that of the original image due to quantization. Namely, the reconstructed image may have distortion. Thus, a filtering operation may be performed on the reconstructed image to effectively reduce at least a degree of distortion generated during quantization. Because these filtered reconstructed images are used as references for subsequently encoded images to predict future image signals, the foregoing filtering operation may also be referred to as loop filtering (i.e., a filtering operation in an encoding loop).

Figures 3, 4:
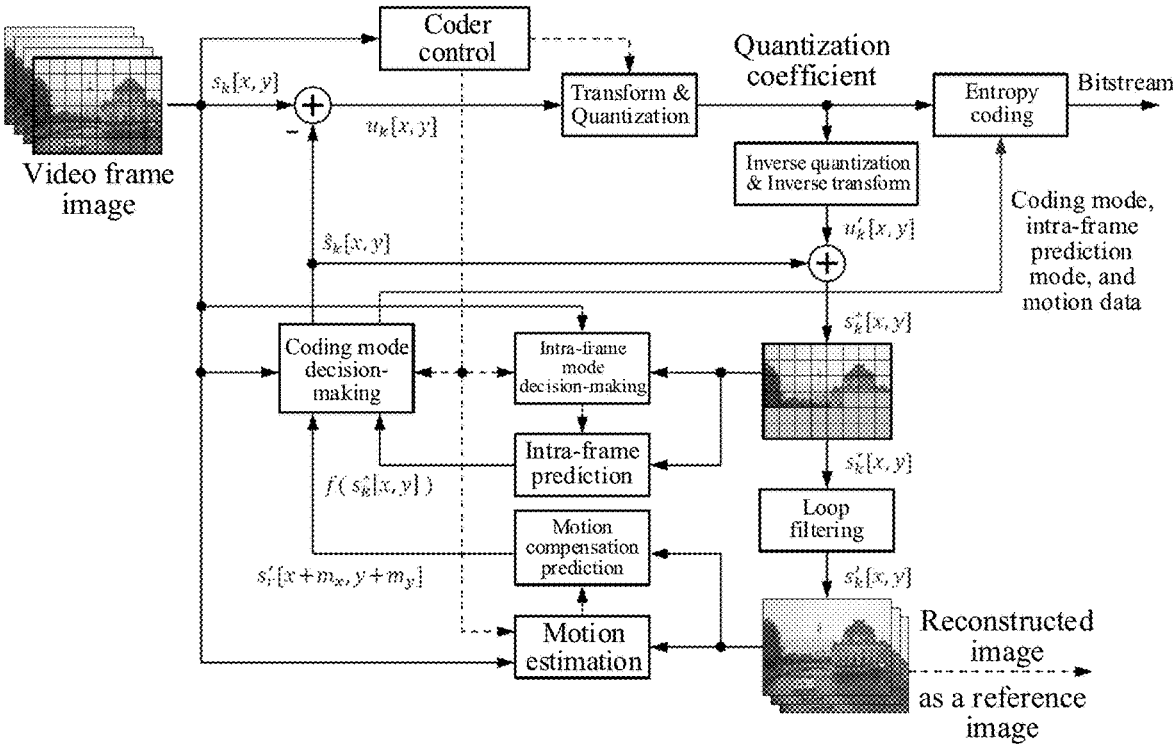
FIG. 3 illustrates a flowchart of exemplary operations performable by a video encoder, according to some embodiments.
FIG. 4 illustrates a schematic diagram of an exemplary structure and process associated with loop filtering of VVC, according to some embodiments.

FIG. 3 illustrates a flowchart associated with exemplary operations performable by a video encoder, according to some embodiments. In the example embodiments of FIG. 3, intra-frame prediction is used as an example for description. A difference operation is performed between the original image signal $s_k[x,y]$ and the predicted image signal $\hat{s}_k[x,y]$ to obtain a residual signal $u_k[x,y]$, and after the residual signal $u_k[x,y]$ is transformed and quantized, a quantization coefficient is obtained. On the one hand, an encoded bit stream is obtained through entropy coding using the quantization coefficient, and a reconstructed residual signal $u'_k[x,y]$ is obtained through inverse quantization and inverse transform processing. The predicted image signal $\hat{s}_k[x,y]$ is superposed with the reconstructed residual signal $u'_k[x,y]$ to generate a reconstructed image signal $$s_k^*[x, y].$$

Further, the reconstructed image signal $$s_k^*[x, y]$$

is inputted to an intra-frame mode decision-making module and an intra-frame prediction module to perform intra-frame prediction processing. Accordingly, filtering processing is performed by using loop filtering, and a filtered image signal s'$_k$[x,y] is outputted. The filtered image signal s'$_k$[x,y] may be used as a reference image of a next frame to perform motion estimation and motion compensation prediction. Then, a predicted image signal ŝ$_k$[x,y] of the next frame is obtained based on a result s'$_r$ [x+m$_x$,y+m$_y$] of motion compensation prediction and a result $$f(s_k^*[x, y])$$

of intra-frame prediction, and the foregoing process may continue to be repeated until encoding is completed.

In the foregoing coding/encoding procedure, loop filtering is one of the core modules of video encoding, and a plurality types of encoding distortion can be effectively removed. In this regard, the latest generation of international video coding/encoding standard VVC supports four different types of loop filters: deblocking filter (DF), sample adaptive offset (SAO), adaptive loop filter (ALF), and cross-component adaptive loop filter (CC-ALF).

An exemplary structure and process associated with loop filtering of the VVC are described below with reference to FIG. 4. It can be understood that one or more operations in FIG. 4 may be similar to one or more operations in FIG. 3. In loop filtering, ALF and CC-ALF are Wiener filters that can determine filter coefficients adaptively according to the content of different video components, thereby reducing a mean square error (MSE) between a reconstructed component and an original component. Input to ALF may include a reconstructed pixel value obtained after filtering by the DF and the SAO, and output of the ALF may include an enhanced reconstructed luma image and a reconstructed chroma image. Input to CC-ALF may include a luma component that is filtered by the DF and the SAO and that is not processed by ALF, and output of the CC-ALF may include a corrected value of a corresponding chroma component. Namely, CC-ALF may be used only for the chroma component. Specifically, a corrected value of the chroma component may be obtained through linear filtering the luma component by using a correlation between the luma component and the chroma component, and the corrected value may be added to the chroma component obtained through ALF filtering and may be used as a final reconstructed chroma component. As an adaptive filter, the Wiener filter may generate different filtering coefficients for video content of different characteristics. Therefore, ALF and CC-ALF need to classify or categorize the video content and use a corresponding filter for video content of each category. In a current VVC design, ALF of the luma component supports 25 different categories of filters. ALF of the chroma component supports up to 8 different categories of filters. CC-ALF of the chroma component supports up to 4 different categories of filters.

For the luma component, ALF may adaptively use different filters at a subblock level. For instance, in the VCC, ALF may adaptively use different filters for a 4×4 luma block (i.e., each 4×4 luma component pixel block needs to be classified into one of the 25 types or categories of filters.) A classification index C of the luma component pixel block may be obtained jointly by a directionality feature D of the luma component pixel block and a quantized activity feature A. Specifically, see the following formula (1):

$$C=5D+\hat{A} \tag{Formula (1)}$$

To calculate D and Â, a horizontal gradient value H$_{k,l}$, a vertical gradient value V$_{k,l}$, a diagonal gradient value D0$_{k,l}$, and an anti-diagonal gradient value D1$_{k,l}$, of each pixel in the 4×4 luma component pixel block need to be calculated, which are specifically shown in the following formulas (2) to (5):

$$H_{k,l}=|2R(k,l)-R(k-1,l)-R(k+1,l)| \tag{Formula (2)}$$

$$V_{k,l}=|2R(k,l)-R(k,l-1)-R(k,l+1)| \tag{Formula(3)}$$

$$D0_{k,l}=|2R(k,l)-R(k-1,l-1)-R(k+1,l+1)| \tag{Formula(4)}$$

$$D1_{k,l}=|2R(k,l)-R(k-1,l+1)-R(k+1,l-1)| \tag{Formula(5)}$$

In the foregoing formulas, R(k,l) indicates a reconstructed pixel value before a position (k,l) is subject to ALF filtering. R(k−1,l) indicates a reconstructed pixel value before a position (k−1,l) is subject to ALF filtering. R(k+1,l) indicates a reconstructed pixel value before a position (k+1,l) is subject to ALF filtering. R(k,l−1) indicates a reconstructed pixel value before a position (k,l−1) is subject to ALF filtering. R(k,l+1) indicates a reconstructed pixel value before a position (k,l+1) is subject to ALF filtering. R(k−1, l−1) indicates a reconstructed pixel value before a position (k−1,l−1) is subject to ALF filtering. R(k+1,l+1) indicates a reconstructed pixel value before a position (k+1,l+1) is subject to ALF filtering. R(k−1,l+1) indicates a reconstructed pixel value before a position (k−1,l+1) is subject to ALF filtering. R(k+1,l−1) indicates a reconstructed pixel value before a position (k+1,l−1) is subject to ALF filtering.

Based on the gradient of each pixel, the horizontal gradient g$_h$, the vertical gradient g$_v$, the diagonal gradient g$_{d0}$, and the anti-diagonal gradient g$_{d1}$, of each 4×4 pixel block are obtained through calculation, which are specifically shown in the following formulas (6) and (7):

$$g_h = \sum_{k=i-2}^{i+5}\sum_{l=j-2}^{j+5} H_{k,l}, \quad g_v = \sum_{k=i-2}^{i+5}\sum_{l=j-2}^{j+5} V_{k,l} \tag{Formula (6)}$$

$$g_{d0} = \sum_{k=i-2}^{i+5}\sum_{l=j-2}^{j+5} D0_{k,l}, \quad g_{d1} = \sum_{k=i-2}^{i+5}\sum_{l=j-2}^{j+5} D1_{k,l} \tag{Formula (7)}$$

i and j indicate pixel coordinates of the upper left corner of the 4×4 pixel block.

After the gradient values of the pixel block is obtained, a maximum value $$g_{h,v}^{max}$$

and a minimum value $$g_{h,v}^{min}$$

in the horizontal direction gradient value and the vertical direction gradient value are respectively:

$$g_{h,v}^{max} = \max(g_h, g_v), \; g_{h,v}^{min} = \min(g_h, g_v) \qquad \text{Formula (8)}$$

A maximum value $$g_{d0,d1}^{max}$$

and a minimum value $$g_{d0,d1}^{min}$$

in the diagonal gradient value and the anti-diagonal angular gradient value are respectively:

$$g_{d0,d1}^{max} = \max(g_{d0}, g_{d1}), \; g_{d0,d1}^{min} = \min(g_{d0}, g_{d1}) \qquad \text{Formula (9)}$$

The directionality feature D is derived by comparing the maximum value and the minimum value of the gradient values in the four directions obtained by using the formula (8) and the formula (9). A specific process is as follows:

S1: If $g_{h,v}^{max} \le t_1 \cdot g_{h,v}^{min}$ and $g_{d0,d1}^{max} \le t_1 \cdot g_{d0,d1}^{min}$ are both valid, set $D$ to 0.

S2: If $g_{h,v}^{max}/g_{h,v}^{min} > g_{d0,d1}^{max}/g_{d0,d1}^{min}$, go to S3; otherwise, go to S4.

S3: If $g_{h,v}^{max} > t_2 \cdot g_{h,v}^{min}$, set $D$ to 2; otherwise, set $D$ to 1.

S4: If $g_{d0,d1}^{max} > t_2 \cdot g_{d0,d1}^{min}$, set $D$ to 4; otherwise, set $D$ to 3.

$t_1$ and $t_2$ are set constants.

The activity feature $\hat{A}$ in the foregoing formula (1) is obtained by quantizing the feature A, obtained through calculation by using the following formula (10), to an interval of [0-4]:

$$A = \sum_{k=i-2}^{i+5} \sum_{l=j-2}^{j+5} (V_{k,l} + H_{k,l}) \qquad \text{Formula (10)}$$

In addition, before filtering is performed on each 4×4 luma component pixel block, geometric transform may be performed on a filter coefficient and a corresponding amplitude limiting value based on the rules shown in the following Table 1, according to a gradient value of the current block. The geometric transform may include no transformation, diagonal transform, vertical flip, and rotation. The application of the geometric transform to the filter coefficient is equivalent to the application of the geometric transform to the pixel value in a case in which the coefficient remains unchanged, and a purpose of the geometric transform is to align with directivity of content of different blocks as much as possible, thereby reducing a quantity of categories required by ALF, so that different pixels may share the same filter coefficient. By using the geometric transform, the real classification can be increased from 25 types to 100 types without increasing the quantity of ALF filters, thus improving its adaptability.

TABLE 1

| Gradient value | Geometric transform |
| --- | --- |
| $g_{d1} < g_{d0}$ and $g_h < g_v$ | No transformation |
| $g_{d1} < g_{d0}$ and $g_v \le g_h$ | Diagonal transform |
| $g_{d0} \le g_{d1}$ and $g_h < g_v$ | Vertical flip |
| $g_{d0} \le g_{d1}$ and $g_v \le g_h$ | Rotation |

The foregoing describes a process of classification and geometric transform of a luma component pixel block by ALF, and the following describes a process of filtering and classification by CC-ALF.

Figures 5, 6:
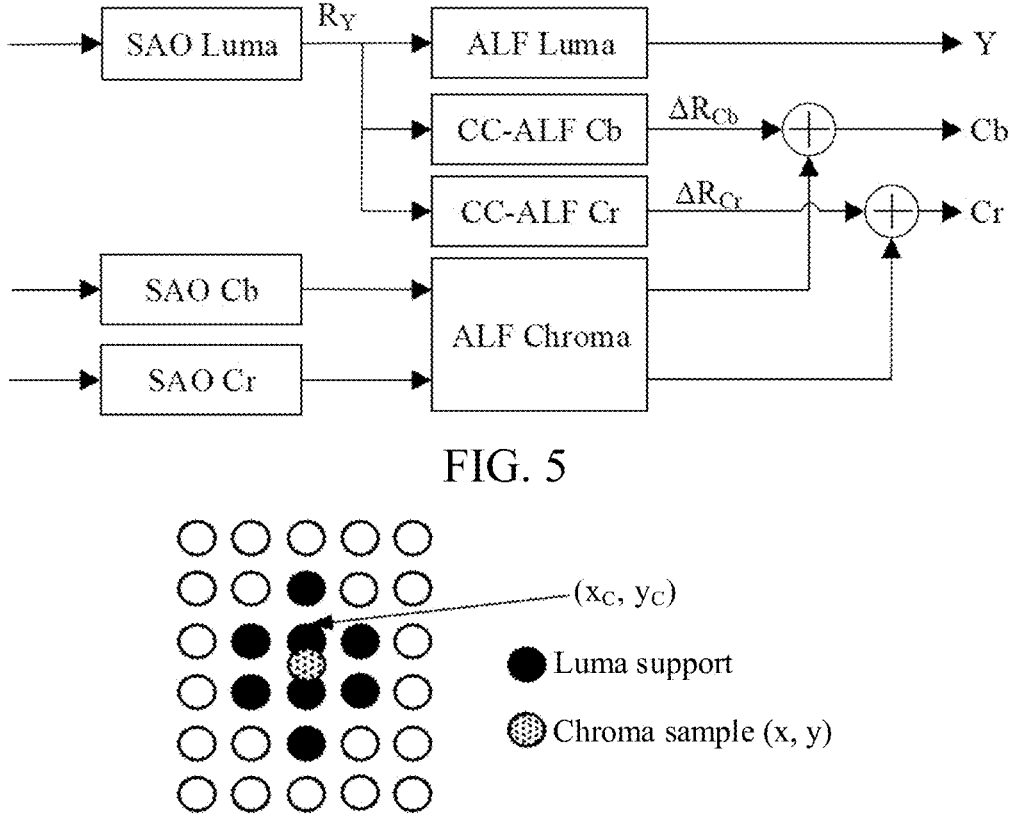
FIG. 5 illustrates a schematic diagram of an example CC-ALF procedure and a relationship with ALF, according to some embodiments.
FIG. 6 illustrates a schematic diagram of an example of a diamond-shaped filter, according to some embodiments.

CC-ALF may generate, by linear filtering a luma component, a corresponding corrected value for each chroma component. An exemplary procedure of CC-ALF and a relationship thereof with ALF are illustrated in FIG. 5. As shown in FIG. 5, the SAO-filtered luma component $R_Y$ is inputted to the ALF filter for filtering processing of the luma component and outputting a value Y of the luma component. In addition, the value $R_Y$ of the SAO-filtered luma component is inputted to the CC-ALF filter to separately perform filtering processing on the two chroma components Cb and Cr, to obtain corrected values $\Delta R_{Cb}$ and $\Delta R_{Cr}$ of the two chroma components. The values of the two chroma components after SAO filtering are inputted to the ALF filter for filtering on the chroma component. Then, filtering results of the ALF filter on the two chroma components are respectively superposed with the corrected values $\Delta R_{Cb}$ and $\Delta R_{Cr}$, and values Cb and Cr of the chroma components are outputted accordingly.

Specifically, a filtering process of CC-ALF may be defined in the following formula (11):

$$\Delta R_i(x,y) = \Sigma_{(x_0,y_0)\in S_i} R_Y(x_C+x_0, y_C+y_0) c_i(x_0,y_0) \qquad \text{Formula (11)}$$

$\Delta R_i(x,y)$ indicates a corrected value (i.e., an offset value) of a chroma component i at a sample location (x,y); $S_i$ indicates a filtering area supported by the CC-ALF filter on the luma component; $c_i(x_0,y_0)$ indicates a filter coefficient corresponding to the chroma component i; $R_Y$ indicates a luma component; $(x_C,y_C)$ indicates a position of a luma component obtained from the chroma component; and $(x_0, y_0)$ indicates an offset position corresponding to the luma component, and said offset position may be obtained by transforming coordinates of the chroma component according to a scaling relationship between luma and chroma that are corresponding to a video sequence.

CC-ALF may support a 3×4 diamond-shaped filter. An example of a diamond-shaped filter is illustrated in FIG. 6. Compared with ALF, the CC-ALF eliminates the limitation of symmetry in filter coefficient, so that the filter coefficient can flexibly adapt to a relative relationship between a plurality of luma components and chroma components. In addition, to reduce a filter coefficient that needs to be transmitted, in the current VVC design, CC-ALF has the following two limitations on the filter coefficient: (1) A sum of all coefficients of CC-ALF is limited to 0. Therefore, for a 3×4 diamond-shaped filter, only seven filter coefficients need to be calculated and transmitted, and a filter coefficient at a center position may be automatically inferred at a decoder according to this condition. (2) An absolute value of each filter coefficient that needs to be transmitted must be a power of 2, and can be represented by up to 6 bits. Therefore, the absolute value of the filter coefficient of CC-ALF may be {0, 2, 4, 8, 16, 32, 64}. In this design, a shift operation may be used instead of a multiplication operation, thereby reducing multiplication operations.

Unlike classification and adaptive selection at the sub-block level supported by ALF of the luma component, CC-ALF only supports classification and adaptive selection at the CTU level. For each chroma component, all chroma pixels in a CTU may belong to the same category and may use the same filter.

In addition, an adaptation parameter set (APS) may include up to 25 groups of luma filter coefficients and corresponding amplitude limiting indexes, two chroma components may have up to 8 groups of chroma filter coefficients and corresponding amplitude limiting indexes, and each chroma component may have up to 4 groups of CC-ALF filter coefficients. To save a bit rate, for an ALF filter of a luma component, filter coefficients of different categories may be merged, so that a plurality of categories may share one group of filter coefficients, and the encoder may determine which categories of coefficients may be merged by means of rate-distortion optimization (RDO), and at the same time, an index of an APS used by a current slice may be marked in a slice header. CC-ALF supports adaptation at the CTU level. In the case of a plurality of filters, CC-ALF and the index of the filter used are selected adaptively for each chroma component at the CTU level.

In the current CC-ALF design, a maximum of 4 filters are supported for each chroma component. Namely, a maximum of 4 different categories are supported. An upper limit of the categories causes poor differentiation among different categories. Rough adaptive selection at the CTU level results in poor differentiation of different content. This reduces accuracy of content classification in CC-ALF, reduces an adaptive capability of CC-ALF, and further affects performance of CC-ALF.

Based on this, example embodiments of the present disclosure propose a new technical solution, which may add a block classification category when performing CC-ALF on a chroma component, so as to improve accuracy of content classification in CC-ALF thereby improving an adaptive capability and filtering performance of CC-ALF and improving coding and decoding efficiency.

The implementation details of example embodiments of the present disclosure are described in the following.

Figure 7:
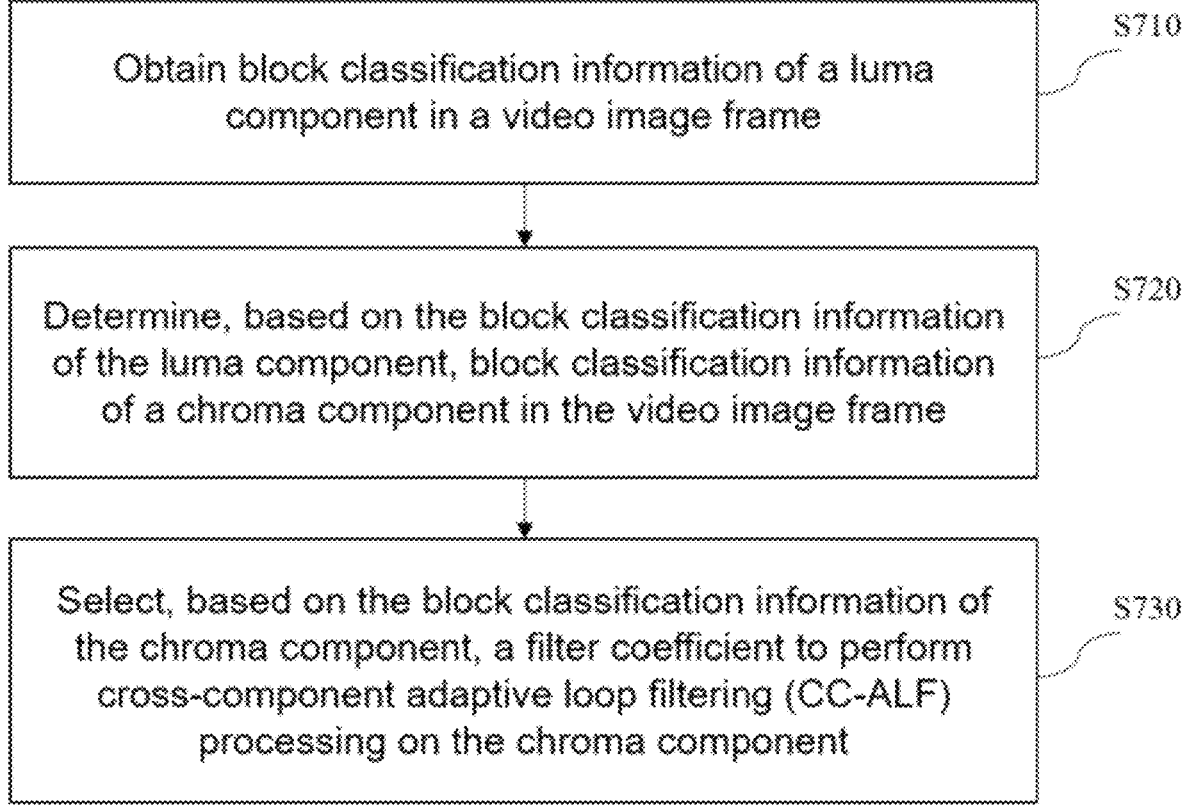
FIG. 7 illustrates a flowchart of an example loop filtering method, according to some embodiments.

FIG. 7 illustrates a flowchart of an example loop filtering method according to some embodiments. The loop filtering method may be performed by a video encoding device, a video decoding device, and/or a loop filtering device. With reference to FIG. 7, the loop filtering method may include at least operations S710 to S730. One or more of said operations S710 to S730 may be performed when adaptive loop filtering (ALF) is performed on luma component and/or when cross-component adaptive loop filtering (CC-ALF) is performed on the chroma component. A detailed description of each of said operations S710 to S730 is provided in the following.

Operation S710: Obtain block classification information of a luma component in a video image frame. According to some embodiments, the block classification information of the luma component may be obtained when ALF is performed on the luma component.

The block classification information may refer to information used for indicating a subblock level classification result, may include identification information corresponding to a classification category, and may include, for example, a classification index.

In some embodiments, a block classification process when ALF is performed on the luma component may refer to a specific classification index calculated via the foregoing formulas (1) to (10), and thus the block classification information may be determined when ALF is performed on the luma components.

Operation S720: Determine, according to the block classification information of the luma component, block classification information of a chroma component in the video image frame. According to some embodiments, the block classification information of the chroma component may be obtained when CC-ALF is performed on the chroma component.

In some embodiments, a classification result for a subblock when ALF is performed on the luma component may be used as a classification result of a block with a same size when CC-ALF is performed on the chroma component. For example, assuming that a classification result of a luma component of a subblock when ALF is performed indicates that the subblock belongs to a third type, a chroma component of said subblock when CC-ALF is performed also belongs to the third type, that is, a category of the luma component of the subblock when ALF is performed may be shared or be the same with a category of the subblock when CC-ALF is performed.

Since the luma component has a relatively large quantity of classification categories when ALF is performed, by using the classification result for the subblock when ALF is performed on the luma component as the classification result for the same size block when CC-ALF is performed on the chroma component, a block classification category when CC-ALF is performed on the chroma component can be added, content classification accuracy in CC-ALF can be improved, and an adaptive capability and filtering performance of CC-ALF can be further improved, thereby improving encoding and decoding efficiency.

In some embodiments, a classification result and a corresponding geometric transform type of the subblock when ALF is performed on the luma component may be used as a classification result and a geometric transform type of the same size block when CC-ALF is performed on the luma component. The example embodiments may also increase a block classification category when CC-ALF is performed on a chroma component, thereby improving accuracy of content classification in CC-ALF, improving an adaptive capability and filtering performance of CC-ALF, and improving encoding and decoding efficiency.

Operation S730: Select, based on the block classification information of the chroma component, a filter coefficient to perform cross-component adaptive loop filtering processing on the chroma component.

Optionally, a corresponding filter coefficient may be respectively determined based on a block classification category when CC-ALF is performed on the chroma component. Accordingly, based on the block classification information when CC-ALF is performed on the chroma component, a corresponding filter coefficient may be selected to perform CC-ALF processing on the chroma component.

Further, in some embodiments, a merging result of various types of filters when CC-ALF is performed on the chroma component may be determined, based on a merging result of various types of filters when ALF is performed on the luma component. For example, the merging result of various types of filters when ALF is performed on the luma component may be used as a merging result of various types of filters when CC-ALF is performed on the chroma component. In an exemplary implementation process, various types of filters are merged when ALF is performed, and at least two ALF filters may be merged by performing each possible merging manner, corresponding rate distortion costs are calculated, and a merging result obtained according to a merging manner in which rate distortion costs are minimum is used as the merging result of all types of filters in a case that ALF is performed. By merging the filters, it is possible to transmit as few filter coefficients as possible, thereby saving a bit rate.

In some embodiments, one or more merging results of various types of filters when ALF is performed on the luma component and when CC-ALF is performed on the chroma component may be determined, based on a rate distortion cost of performing filter merging when ALF process is performed on the luma component and a rate distortion cost of performing filter merging when CC-ALF process is performed on the chroma component. The technical solution of the example embodiments may jointly optimize ALF of the luma component and CC-ALF of the chroma component to simultaneously determine the merging result(s) of various types of filters of ALF and CC-ALF In some embodiments, a quantity of available filters when CC-ALF is performed on the chroma component may be determined, based on a quantity of filters determined when ALF is performed on the luma component. For example, the quantity of filters determined when ALF is performed on the luma component may be used as the quantity of available filters when CC-ALF is performed on the chroma component.

The loop filtering method in the embodiment shown in FIG. 7 may be applied to an encoding process of a video encoder, or may be applied to a decoding process of a video decoder.

FIG. 8 illustrates a flowchart of an example video encoding method according to some embodiments. The video encoding method may be performed by a video encoding device. Further, one or more operations in FIG. 8 may be similar to one or more operations in FIG. 7. With reference to FIG. 8, the video encoding method may include at least operations S810 to S840. One or more of said operations S810 to S840 may be performed when AFL is performed on the luma component and/or when CC-ALF is performed on the chroma component. A detailed description of said operations S810 to S840 is provided in the following.

Operation S810: Obtain block classification information of a luma component in a video image frame.

Operation S820: Determine, according to the block classification information of the luma component, block classification information of a chroma component in the video image frame.

Operation S830: Select, based on the block classification information of the chroma component, a filter coefficient to perform CC-ALF processing on the chroma component.

For related explanations and implementations of operations S810 to S830, references may be made to the foregoing embodiments.

Step S840: Perform encoding processing on the video image frame according to an ALF processing result of the luma component and a CC-ALF processing result of the chroma component, to obtain a video bitstream. Specifically, a corresponding filter coefficient may be determined based on the block classification information when that ALF is performed on the luma component, and ALF processing is performed on the luma component according to the filter coefficient to obtain an ALF processing result. Accordingly, encoding processing can be performed on the video image frame according to the ALF processing result and the CC-ALF processing result to obtain a video bitstream.

In the video encoding method shown in FIG. 8, a block classification category when CC-ALF is performed on the chroma component may be added, so as to improve accuracy of content classification in CC-ALF, thereby improving an adaptive capability and filtering performance of CC-ALF, and improving encoding efficiency.

In some embodiments, a block classification policy in the video encoding method shown in FIG. 8 (i.e., determining, based on the block classification information when ALF is performed on the luma component, the block classification information when CC-ALF is performed on the chroma component) may be used independently, or may be used together with another classification policy (for example, a classification policy in a related technology). Descriptions of these two example use cases are provided in the following. Using the Block Classification Policy Shown in FIG. 8 Alone:

In embodiments which the block classification policy shown in FIG. 8 is used alone, the encoder may encode, in a video bitstream, a first flag bit corresponding to a current slice of a video image frame. A value of the first flag bit is used for indicating whether a chroma component of a target block in the current slice uses the CC-ALF processing manner or mode proposed in the example embodiments (e.g., the CC-ALF processing manner of the block classification policy in FIG. 8 is used, etc.) In this regard, when the block classification policy shown in FIG. 8 is used alone, the first flag bit corresponding to the current slice may directly indicate whether the chroma component of the target block in the current slice uses the CC-ALF processing manner/mode proposed in the example embodiments.

In some embodiments, if the value of the first flag bit is a first value (for example, 1), it indicates that chroma components of at least a portion of target blocks in the current slice use the CC-ALF processing manner proposed in the example embodiments, or it indicates that chroma components of all target blocks in the current slice use the CC-ALF processing manner proposed in the example embodiments. Further, if the value of the first flag bit is a second value (for example, 0), it indicates that chroma components of all target blocks in the current slice do not use the CC-ALF processing manner proposed in the example embodiments.

In some embodiments, the first flag bit is a slice-level flag bit. If the value of the first flag bit indicates that the chroma components of all the target blocks in the current slice use the CC-ALF processing manner proposed in the example embodiments, or indicates that the chroma components of all the target blocks in the current slice do not use the CC-ALF processing manner proposed in the example embodiments, an encode block-level flag bit is not required. However, when the value of the first flag bit indicates that the chroma components of a portion of target blocks in the current slice use the CC-ALF processing manner proposed in the example embodiments, the encoder may encode, in the video bitstream, a second flag bit corresponding to each target block included in the current slice, wherein the value of the second flag bit is used for indicating whether a chroma component of the corresponding target block uses the CC-ALF processing manner proposed in the example embodiments. That is, based on the slice-level flag bit, a block-level flag bit (e.g., the second flag bit) may further be used for indicating that the chroma component of the target block needs to use the CC-ALF processing manner proposed in the example embodiments.

In some embodiments, since there are two chroma components (Cr and Cb), for a target block, one second flag bit may be set for each of the two chroma components of the target block, and a value of each second flag bit may be used for indicating whether a corresponding chroma component in the target block uses the CC-ALF processing manner proposed in the example embodiments.

In some embodiments, the two chroma components (Cr and Cb) of the target block may also correspond to the same second flag bit, and the value of the same second flag bit may be used for indicating whether the two chroma components in the target block use the CC-ALF processing manner proposed in the example embodiments.

Similarly, for the current slice, one first flag bit may be set for each of the two chroma components of the current slice, and a value of each first flag bit may be used for indicating whether a corresponding chroma component in the current slice uses the CC-ALF processing manner proposed in the example embodiments.

In some embodiments, the two chroma components of the current slice may also correspond to the same first flag bit, and a value of the same first flag bit may be used for indicating whether the two chroma components of the current slice use the CC-ALF processing manner proposed in the example embodiments.

If a slice-level flag bit respectively sets one first flag bit for the two chroma components, a block-level flag bit may also respectively set one second flag bit for the two chroma components. If a block-level flag bit sets one second flag bit for the two chroma components, a slice-level flag bit only needs to set one first flag bit for the two chroma components.

In some embodiments, the encoder may determine, in a rate-distortion optimization manner, whether a chroma component of each target block uses the CC-ALF processing manner proposed in the example embodiments. Specifically, the encoder may calculate a first rate distortion cost of the chroma component of each target block when the CC-ALF processing proposed in the example embodiments is used, calculate a second rate distortion cost of the chroma component of each target block when the CC-ALF processing is not used, and then determine, according to the first rate distortion cost and the second rate distortion cost, whether the chroma component of each target block uses the CC-ALF processing manner proposed in the example embodiments. For example, if a first rate distortion cost corresponding to a chroma component of a target block is less than a second rate distortion cost, it indicates that the chroma component of the target block uses the CC-ALF processing manner proposed in the example embodiments. If a first rate distortion cost corresponding to a chroma component of a target block is greater than a second rate distortion cost, it indicates that the chroma component of the target block does not use the CC-ALF processing manner provided in the example embodiments. By calculating the rate distortion cost to determine whether or not the CC-ALF processing manner proposed in the example embodiments is used, coding efficiency can be ensured while rate distortion costs can be reduced as much as possible.

In addition, when deciding whether or not the chroma component of each target block uses the CC-ALF processing manner proposed in the example embodiments, a decision may be respectively made on two chroma components of each target block (i.e., a corresponding rate distortion cost may be separately calculated), or a decision may be simultaneously made on two chroma components of each target block (i.e., rate distortion costs may be superposed).

Using Both the Block Classification Policy Shown in FIG. 8 and Another Classification Policy:

In some embodiments, if the block classification policy shown in FIG. 8 and another classification policy are both used, when encoding needs to be performed, a third flag bit corresponding to the current slice needs to be encoded in the video bitstream, and a value of the third flag bit is used for indicating whether CC-ALF processing needs to be performed on the chroma component of the target block in the current slice. If CC-ALF processing needs to be performed on the chroma component of the target block in the current slice, an index of a corresponding adaptive parameter set is encoded in the video bitstream. A fourth flag bit corresponding to the chroma component of the current slice is encoded in an adaptive set corresponding to the index of the adaptive parameter set. A value of the fourth flag bit is used for indicating a classification policy used when CC-ALF processing is performed on the chroma component of the current slice. The classification policy includes the block classification policy shown in FIG. 8 (i.e., the block classification information when CC-ALF is performed on the chroma component is determined based on the block classification information when ALF is performed on the luma component) and/or another classification policy.

In other words, if the block classification policy shown in FIG. 8 and another classification policy are both used, it is required to indicate, by using a flag bit at a slice level (i.e., a third flag bit), whether to perform CC-ALF processing (which may be the CC-ALF processing manner proposed in the example embodiments and/or another CC-ALF processing manner) on the chroma component of the target block in the current slice. If the CC-ALF processing is performed, it is required to encode the flag bit (i.e., the fourth flag bit) of the classification policy in the corresponding adaptive parameter set (referenced by using the index of the adaptive parameter set), so as to clearly indicate whether the block classification policy shown in FIG. 8 or another classification policy is used. For example, if the value of the fourth flag bit is 1, it indicates that the block classification policy shown in FIG. 8 needs to be used; or if the value of the fourth flag bit is 0, it indicates that another classification policy needs to be used.

If the current slice refers to an APS of a frame that has been encoded, since a corresponding fourth flag bit has already encoded in the previous APS, no further encoding is required. If the current slice is an APS which is not encoded (e.g., the APS of the current frame), the fourth flag bit needs to be encoded in the APS.

In some embodiments, if the value of the third flag bit indicates that CC-ALF processing needs to be performed on chroma components of at least a portion of target blocks in the current slice, a fifth flag bit corresponding to each target block included in the current slice may be encoded in the video bitstream, in order to distinguish on which target blocks the CC-ALF processing needs to be performed. A value of the fifth flag bit may be used for indicating whether CC-ALF processing is performed on the chroma component of the corresponding target block. For example, if the value of the fifth flag bit corresponding to the target block is 1, it indicates that CC-ALF processing needs to be performed on the chroma component of the target block. If the value of the fifth flag bit corresponding to the target block is 0, it indicates that CC-ALF processing does not need to be performed on the chroma component of the target block.

If the slice-level flag bit (i.e., the third flag bit) indicates that CC-ALF processing does not need to be performed on the chroma components of all the target blocks in the current slice, or indicates that CC-ALF processing needs to be performed on the chroma components of all the target blocks, the block-level flag bit (i.e., the fifth flag bit) does not need to be introduced.

As an example, if the value of the slice level flag bit (i.e., the third flag bit) indicates that CC-ALF processing needs to be performed on at least a portion of target blocks in a slice, and a flag bit of a coding classification policy (i.e., the fourth flag bit) indicates that the block classification policy shown in FIG. 8 is used, if a block level flag bit (i.e., the fifth flag bit) of a target block indicates that CC-ALF processing needs to be performed, CC-ALF processing is performed or will be performed on the target block(s) by using the block classification policy shown in FIG. 8.

In some embodiments, since there are two chroma components (Cr and Cb), a technical solution similar to that in the foregoing embodiment may be used for a slice. Namely, one third flag bit may be respectively set for the two chroma components of the current slice, or the same third flag bit may be set for the two chroma components of the current slice. Similarly, for the target block, one fifth flag bit may be respectively set for the two chroma components of the target block, or the same fifth flag bit may be set for the two chroma components of the target block. Similarly, one fourth flag bit may be respectively set in the APS for each of the two chroma components, or the same fourth flag bit may be set in the APS for the two chroma components. For a specific description, references may be made to the foregoing embodiments, and descriptions associated therewith may be omitted herein for conciseness.

In some embodiments, the encoder may determine, in a rate-distortion optimization manner, whether the block classification policy shown in FIG. 8 and/or another classification policy is used when CC-ALF processing is performed on the chroma component of the current slice. Specifically, the encoder may calculate a third rate distortion cost when CC-ALF processing is performed on the chroma components of all the target blocks in the current slice by using the block classification policy shown in FIG. 8, may calculate a fourth rate distortion cost when CC-ALF processing is performed on the chroma components of all the target blocks in the current slice by using another classification policy, and may then determine, according to the third rate distortion cost and the fourth rate distortion cost, a classification policy used when CC-ALF processing is performed on the chroma component of the current slice. For example, if a third rate distortion cost corresponding to a slice is less than a fourth rate distortion cost, it indicates that the block classification policy shown in FIG. 8 is used when CC-ALF processing is performed on a chroma component of the slice. If a third rate distortion cost corresponding to a slice is greater than a fourth rate distortion cost, it indicates that another classification policy is used when CC-ALF processing is performed on a chroma component of the slice.

In some embodiments, the size information of the target block in the foregoing embodiment may be preset by the encoder and the decoder, or may be determined by the encoder. After the size information of the target block is determined, the size information of the target block may be encoded in a sequence parameter set, an image parameter set, an image header, and/or a slice header of the video bitstream. For example, the target block may be a CTU, or may be a block smaller than the CTU.

FIG. 9 illustrates a flowchart of an example video decoding method according to some embodiments. The video decoding method may be performed by a video decoding device. Further, one or more operations in FIG. 9 may be similar to one or more operations in FIG. 7 and FIG. 8. With reference to FIG. 9, the video decoding method may include at least operations S910 to S940. One or more of said operations S910 to S940 may be performed when AFL is performed on the luma component and/or when CC-ALF is performed on the chroma component. A detailed description of said operations S910 to S940 is provided in the following.

Step S910: Obtain block classification information of a luma component in a video image frame.

Step S920: Determine, according to the block classification information of the luma component, block classification information of a chroma component in the video image frame.

Step S930: Select, based on the block classification information of the chroma component, a corresponding filter coefficient to perform CC-ALF processing on the chroma component.

For related explanations and implementations of steps S910 to S930, references may be made to the foregoing embodiments.

Step S940: Perform decoding processing on a video bitstream according to an ALF processing result of the luma component and a CC-ALF processing result of the chroma component.

Specifically, a filter coefficient may be determined according to the block classification information when ALF is performed on the luma component, and ALF processing is performed on the luma component according to the filter coefficient to obtain an ALF processing result, so that the video bitstream can be decoded according to the ALF processing result and the CC-ALF processing result.

In the video decoding method shown in FIG. 9, a block classification category when CC-ALF is performed on the chroma component may be added, so as to improve accuracy of content classification in CC-ALF, thereby improving an adaptive capability and filtering performance of CC-ALF, and improving coding and decoding efficiency.

In some embodiments, a block classification policy in the video decoding method shown in FIG. 9 (i.e., determining, based on the block classification information when ALF is performed on the luma component, the block classification information when CC-ALF is performed on the chroma component) may be used independently, or may be used together with another classification policy (e.g., a classification policy in a related technology). Descriptions of these two example use cases are provided in the following.

Using the Block Classification Policy Shown in FIG. 9 Alone:

In some embodiments, if the block classification policy shown in FIG. 9 is used alone (the block classification policy shown in FIG. 9 is the same as the block classification policy shown in FIG. 8), the decoder may decode the video bitstream to obtain a first flag bit corresponding to a current slice. A value of the first flag bit may be used for indicating whether a chroma component of a target block in the current slice uses the CC-ALF processing manner proposed in the example embodiments (i.e., the CC-ALF processing manner of the block classification policy in FIG. 9 is used). In this regard, when the block classification policy shown in FIG. 9 is used alone, the first flag bit corresponding to the current slice may directly indicate whether the chroma component of the target block in the current slice uses the CC-ALF processing manner proposed in the example embodiments.

In some embodiments, if the value of the first flag bit is a first value (for example, 1), it indicates that chroma components of at least a portion of target blocks in the current slice use the CC-ALF processing manner proposed in the example embodiments, or it indicates that chroma components of all target blocks in the current slice use the CC-ALF processing manner proposed in the example embodiments. If the value of the first flag bit is a second value (for example, 0), it indicates that chroma components of all target blocks in the current slice do not use the CC-ALF processing manner proposed in the example embodiments.

In some embodiments, the first flag bit may be a slice-level flag bit. If the value of the first flag bit indicates that the chroma components of all the target blocks in the current slice use the CC-ALF processing manner proposed in the example embodiments, or indicates that the chroma components of all the target blocks in the current slice do not use the CC-ALF processing manner proposed in the example embodiments, the block-level flag bit does not need to be decoded (the encoder also does not need to encode the block-level flag bit). However, when the value of the first flag bit indicates that the chroma components of at least a portion of target blocks in the current slice use the CC-ALF processing manner proposed in the example embodiments, the decoder needs to decode the video bitstream to obtain a second flag bit corresponding to each target block included in the current slice, wherein the value of the second flag bit may be used for indicating whether a chroma component of the corresponding target block uses the CC-ALF processing manner proposed in the example embodiments. Namely, in some embodiments, based on the slice-level flag bit, a block-level flag bit (i.e., the second flag bit) obtained by means of decoding may further be used for indicating that the chroma component of the target block needs to use the CC-ALF processing manner proposed in the example embodiments.

In some embodiments, since there are two chroma components (Cr and Cb), one second flag bit may be set for each of the two chroma components of the target block, and a value of each second flag bit may be used for indicating whether a corresponding chroma component in the target block uses the CC-ALF processing manner proposed in the example embodiments.

In some embodiments, the two chroma components (Cr and Cb) of the target block may also correspond to the same second flag bit, and the value of the same second flag bit may be used for indicating whether the two chroma components in the target block use the CC-ALF processing manner proposed in the example embodiments.

Similarly, for the current slice, one first flag bit may be set for each of the two chroma components of the current slice, and a value of each first flag bit may be used for indicating whether a corresponding chroma component in the current slice uses the CC-ALF processing manner proposed in the example embodiments.

In some embodiments, the two chroma components of the current slice may also correspond to the same first flag bit, and a value of the same first flag bit is used for indicating whether the two chroma components of the current slice use the CC-ALF processing manner proposed in this embodiment of this application.

If a slice-level flag bit respectively sets one first flag bit for the two chroma components, a block-level flag bit may also respectively set one second flag bit for the two chroma components. If a block-level flag bit sets one second flag bit for the two chroma components, a slice-level flag bit only needs to set one first flag bit for the two chroma components.

In some embodiments, the decoder may decode the video bitstream to obtain an adaptive parameter set, wherein the adaptive parameter set may include a filter coefficient of CC-ALF. In this case, if the value of the first flag bit indicates that a chroma component of at least one target block in the current slice uses CC-ALF processing proposed in the example embodiments, an index of the adaptive parameter set corresponding to the current slice may be obtained by decoding the video bitstream, and then a corresponding filter coefficient may selected from the adaptive parameter set corresponding to the index of the adaptive parameter set, to perform filtering processing on the chroma component of the corresponding target block in the current condition.

Using Both the Block Classification Policy Shown in FIG. 9 and Another Classification Policy:

In some embodiments, if the block classification policy shown in FIG. 9 and another classification policy are both used, the adaptive parameter set and a third flag bit corresponding to the current slice need to be obtained from decoding the video bitstream, and a value of the third flag bit may be used for indicating whether CC-ALF processing is performed or needs to be performed on the chroma component of the target block in the current slice; and if CC-ALF processing needs to be performed on the chroma component of the target block in the current slice, the video bitstream may be decoded to obtain the index of the adaptive parameter set corresponding to the current slice. Then, a fourth flag bit corresponding to the chroma component of the current slice is obtained in an adaptive set corresponding to the index of the adaptive parameter set. A value of the fourth flag bit may be used for indicating a classification policy used in a case that CC-ALF processing is performed on the chroma component of the current slice. The classification policy may include the block classification policy shown in FIG. 9 (i.e., determining, based on the block classification information when ALF is performed on the luma component, the block classification information when CC-ALF is performed on the chroma component) and/or another classification policy.

In other words, if the block classification policy shown in FIG. 9 and another classification policy are both used, it is required to indicate, by using a flag bit at a slice level (i.e., a third flag bit), whether to perform CC-ALF processing (which may be the CC-ALF processing manner proposed in the example embodiments or another CC-ALF processing manner) on the chroma component of the target block in the current slice. If the CC-ALF processing is performed, it is required to obtain, by decoding the video bitstream, the flag bit (i.e., the fourth flag bit) of the classification policy in the corresponding adaptive parameter set (referenced by using the index of the adaptive parameter set), so as to clearly indicate whether or not the block classification policy shown in FIG. 9 or another classification policy is used.

For example, if the value of the fourth flag bit corresponding to the chroma component of the current slice is the first value (e.g., 1), it indicates that a classification policy used when CC-ALF processing is performed on the chroma component of the current slice is the classification policy shown in FIG. 9. If the value of the fourth flag bit corresponding to the chroma component of the current slice is the second value (e.g., 0), it indicates that a classification policy used when CC-ALF processing is performed on the chroma component of the current slice is another classification policy.

In some embodiments, if the value of the third flag bit indicates that CC-ALF processing needs to be performed on chroma components of at least a portion of target blocks in the current slice, a fifth flag bit corresponding to each target block included in the current slice may be obtained by decoding the video bitstream, in order to distinguish on which target blocks CC-ALF processing needs to be performed. A value of the fifth flag bit may be used for indicating whether CC-ALF processing is performed on the chroma component of the corresponding target block. For example, if the value of the fifth flag bit corresponding to the target block is 1, it indicates that CC-ALF processing needs to be performed on the chroma component of the target block. If the value of the fifth flag bit corresponding to the target block is 0, it indicates that CC-ALF processing does not need to be performed on the chroma component of the target block.

If the slice-level flag bit (i.e., the third flag bit) indicates that CC-ALF processing does not need to be performed on the chroma components of all the target blocks in the current slice, or indicates that CC-ALF processing needs to be performed on the chroma components of all the target blocks, the block-level flag bit (i.e., the fifth flag bit) does not need to be introduced.

As an example, if the value of the slice level flag bit (i.e., the third flag bit) indicates that CC-ALF processing needs to be performed on at least a portion of target blocks in a slice and a flag bit of a coding classification policy (i.e., the fourth flag bit) indicates that the block classification policy shown in FIG. 9 is used, and if a block level flag bit (i.e., the fifth flag bit) of a target block indicates that CC-ALF processing needs to be performed, CC-ALF processing may be performed for the target block by using the block classification policy shown in FIG. 9.

In some embodiments, since there are two chroma components (Cr and Cb), a technical solution similar to that in the foregoing embodiments may be used for a slice. Namely, one third flag bit may be respectively set for the two chroma components of the current slice, or the same third flag bit may be set for the two chroma components of the current slice. Similarly, one fifth flag bit may be separately set for the two chroma components of the target block, or the same fifth flag bit may be set for the two chroma components of the target block. For a specific description, references may be made to the foregoing embodiments, and descriptions associated therewith may be omitted herein for conciseness.

In some embodiments, the size information of the target block in the foregoing embodiment may be preset by the encoder and the decoder, or may be determined by the encoder. After the size information of the target block is determined, the size information of the target block may be encoded in a sequence parameter set, an image parameter set, an image header, and/or a slice header of the video bitstream. In this way, the decoder needs to decode corresponding size information from the video bitstream. For example, the target block may be a CTU, or may be a block smaller than the CTU.

The foregoing respectively describes the example embodiments of the present disclosure according to an encoder and a decoder. Further descriptions of implementation details of the example embodiments are provided in the following.

According to some embodiments, a method for determining a classification result of CC-ALF may be provided. For instance, the method may include determining a classification result of CC-ALF of a chroma component at a subblock level, wherein the subblock level may be the same level according to a classification situation of ALF of a luma component at a subblock level. Further, a method for adaptively selecting a filter at different levels according to the classification result may be provided.

In one aspect, one or more embodiments of the present disclosure propose that a quantity of CC-ALF filters that can be supported by each chroma component may be set as a quantity of ALF filters that can be supported by the luma component, and a CC-ALF classification status of the chroma component may be determined according to an ALF classification process of the luma component. The technical solutions proposed in the example embodiments may be used independently or in combination.

Specifically, a classification result of CC-ALF of the chroma component may be determined based on a classification status of ALF of the luma component at a subblock level. For example, the classification result of ALF of the luma component at the subblock level may be used as the classification result of CC-ALF on the same size block. A classification process of ALF of the luma component at the subblock level is described in the foregoing formulas (1) to (10).

In some embodiments, a classification result and a corresponding geometric transform type of ALF of the luma component at the subblock level may be used as a classification result and a geometric transform type of CC-ALF of the chroma component on the same size block. A classification process of ALF of the luma component at the subblock level is described in the foregoing formulas (1) to (10).

In some embodiments, a process of merging various types of filters by using CC-ALF of the chroma component may be determined according to a process of merging various types of filters by using ALF of the luma component. For example, a merging result of various types of filters by using ALF of the luma component may be used as a merging result of various types of filters by using CC-ALF of the chroma component. Alternatively, the merging result of various types of filters by using ALF of the luma component and the merging result of various types of filters by using CC-ALF of the chroma component may be determined by jointly optimizing ALF of the luma component and CC-ALF of the two chroma components.

In some embodiments, a quantity of available filters of CC-ALF of each chroma component may be determined according to a final quantity of filters of ALF of the luma component.

In some embodiments, a technical solution of adaptively selecting, at different levels and based on the foregoing classification manner of CC-ALF of the chroma component, a filter category and transmitting one or more parameters associated with the filter is proposed. Specifically, in some embodiments, the classification method proposed herein may be used alone, and in some embodiments, the classification method proposed herein and an existing classification method in a related CC-ALF technology may both be used. The Classification Method Proposed in the Example Embodiments is Used Alone, and Two Chroma Components are Respectively Used for Performing CC-ALF Selection Decision-Making:

In some embodiments, when only the classification method proposed in the example embodiments is used in CC-ALF of the chroma component, CC-ALF selection decision-making and parameter transmission may be respectively performed for two chroma components Cb and Cr.

Specifically, for each chroma component, CC-ALF related parameters that need to be transmitted by the encoder may include the following:

1. Flag bit indicating whether or not CC-ALF is used (On/Off) at the CTU level. For example, if the flag bit is 1, it indicates that a corresponding chroma component sample in the current CTU is filtered by using CC-ALF (since the classification method provided in the example embodiments is used alone, if it is indicated that CC-ALF is used for filtering, the classification method provided in the example embodiments is used). If the flag bit is 0, it indicates that the corresponding chroma component in the current CTU does not use CC-ALF filtering.

2. Flag bit indicating whether CC-ALF is used at the slice level. For example, if the flag bit is 1, it indicates that a chroma component corresponding to at least one CTU in a current slice uses CC-ALF (since the classification method provided in the example embodiments is used alone, if it is indicated that CC-ALF is used for filtering, the classification method provided in the example embodiments is used). If the flag bit is 0, it indicates that no CC-ALF is used for the chroma components corresponding to all the CTUs in the current slice.

In some embodiments, if the flag bit indicating whether CC-ALF is used at the slice level is 1, it may further indicate that CC-ALF is used for the chroma components corresponding to all the CTUs in the current slice.

If the flag bit indicating whether CC-ALF is used at the slice level indicates that CC-ALF is not used for the chroma components corresponding to all the CTUs in the current slice, or that CC-ALF is used for the chroma components corresponding to all the CTUs in the current slice, the encoder does not need to encode the flag bit indicating whether or not CC-ALF is used at the CTU level, and the decoder does not need to perform decoding to obtain the same.

3. Related parameters in APS: If the CC-ALF flag bit of the slice level is 1, a coefficient of each filter in the CC-ALF filter group corresponding to the related chroma component may need to be transmitted. Other CC-ALF-related control parameters, such as a quantity of filters included in the filter group, a filter merging index, and the like, do not need to be additionally transmitted, and may be inferred from corresponding parameters of ALF of the luma component.

For each chroma component, an encoder may perform a decision process of whether to use CC-ALF for the chroma component corresponding to the CTU level (since the classification method provided in the example embodiments is used alone, if CC-ALF is used for filtering, the classification method provided in the example embodiments is used). Descriptions of an exemplary decision process are provided in the following:

A) Calculate a sample of a corresponding chroma component in the current CTU without using a rate distortion cost (RDCost) of CC-ALF filtering.

B) For each sample of the corresponding chroma component in the current CTU, select a CC-ALF filter for filtering, based on a category to which a corresponding luma component sample belongs. Further, a rate distortion cost may be calculated. A category to which a luma component sample belongs does not need to be explicitly transmitted, and the decoder may obtain the same through inferring when processing the luma component sample.

C) Compare rate distortion costs calculated in two cases. If the costs of not using the CC-ALF filter are relatively small, it may be determined that the chroma component corresponding to the CTU level does not use CC-ALF, and the flag bit of CC-ALF at the CTU level may be set to 0; otherwise, said flag bit may be set to 1.

The Classification Method Proposed in the Example Embodiments is Used Alone, and Two Chroma Components are Jointly Used for Performing CC-ALF Selection Decision-Making:

In some embodiments, when only the classification method proposed in the example embodiments is used in CC-ALF of the chroma component, CC-ALF selection decision-making and parameter transmission may be jointly performed for two chroma components Cb and Cr.

Specifically, for the two chroma components, CC-ALF related parameters that need to be transmitted by the encoder may include the following:

1. Flag bit indicating whether or not CC-ALF is used (On/Off) at the CTU level. For example, if the flag bit is 1, it indicates that two chroma component samples in the current CTU are filtered by using CC-ALF (since the classification method provided in the example embodiments is used alone, if it is indicated that CC-ALF is used for filtering, the classification method provided in the example embodiments is used). If the flag bit is 0, it indicates that two chroma components in the current CTU do not use CC-ALF filtering.

2. Flag bit indicating whether CC-ALF is used at the slice level. For example, if the flag bit is 1, it indicates that two chroma components of at least one CTU in a current slice use CC-ALF (since the classification method provided in the example embodiments is used alone, if it is indicated that CC-ALF is used for filtering, the classification method provided in the example embodiments is used). If the flag bit is 0, it indicates that two chroma components of all the CTUs in the current slice do not use CC-ALF.

In some embodiments, if the flag bit indicating whether CC-ALF is used at the slice level is 1, it may further indicate that CC-ALF is used for two chroma components of all the CTUs in the current slice.

If the flag bit indicating whether CC-ALF is used at the slice level indicates that CC-ALF is not used for two chroma components of all the CTUs in the current slice, or that CC-ALF is used for the two chroma components of all the CTUs in the current slice, the encoder does not need to encode the flag bit indicating whether or not CC-ALF is used at the CTU level, and the decoder does not need to perform decoding to obtain the same.

3. Related parameters in APS: If the CC-ALF flag bit of the slice level is 1, a coefficient of each filter in the CC-ALF filter group corresponding to two chroma components may need to be transmitted. Other CC-ALF-related control parameters, such as a quantity of filters included in the filter group, a filter merging index, and the like, do not need to be additionally transmitted, and may be inferred from corresponding parameters of ALF of the luma component.

For two chroma components, an encoder may perform a decision process of whether to use CC-ALF for two chroma components at the CTU level (since the classification method provided in the example embodiments is used alone, if it is indicated that CC-ALF is used for filtering, the classification method provided in the example embodiments is used). Descriptions of an exemplary decision process are provided in the following:

A) Calculate samples of two chroma components in the current CTU without using a rate distortion cost (RDCost) of CC-ALF filtering.

B) For each sample of the two chroma components in the current CTU, select a CC-ALF filter for filtering, based on a category to which a corresponding luma component sample belongs. Further, a total rate distortion cost of the two chroma components may be calculated. A category to which a luma component sample belongs does not need to be explicitly transmitted, and the decoder may obtain the same through inferring when processing the luma component sample.

C) Compare rate distortion costs calculated in two cases. If the costs of not using the CC-ALF filter are relatively small, it may be determined that the two chroma components at the CTU level does not use CC-ALF, and the flag bit of CC-ALF at the CTU level may be set to 0; otherwise, said flag bit may be set to 1.

The Classification Method Proposed in the Example Embodiments and the Existing Classification Method in the Related CC-ALF Technology are Both Used, and the Classification Methods are Respectively Specified for Two Chroma Components:

In some embodiments, when the classification method proposed in the example embodiments and the existing classification method in the related CC-ALF technology are both used in CC-ALF of the chroma component, the classification methods may be respectively specified for the two chroma components Cb and Cr, so as to use a corresponding classification method for all samples of the chroma components corresponding to the current frame, and separately perform CC-ALF selection decision-making and related parameter transmission.

Specifically, for each chroma component, CC-ALF related parameters that need to be transmitted by the encoder may include the following:

1. Flag bit indicating whether or not CC-ALF is used (On/Off) at the CTU level. For example, if the flag bit is 1, it indicates that a corresponding chroma component sample in a current CTU is filtered by using CC-ALF (a specific classification method used in filtering may be the classification method proposed in the example embodiments, or may be the existing classification method in the related CC-ALF technology; and specifically, a specific classification method needs to be further indicated by using the flag bit in the APS). If the flag bit is 0, it indicates that the corresponding chroma component in the current CTU does not use CC-ALF filtering.

2. Flag bit indicating whether CC-ALF is used at the slice level. For example, if the flag bit is 1, it indicates that a chroma component corresponding to at least one CTU in a current slice uses CC-ALF (similarly, a specific classification method used in filtering may be the classification method proposed in the example embodiments, or may be the existing classification method in the related CC-ALF technology; and specifically, a specific classification method needs to be further indicated by using the flag bit in the APS). If the flag bit is 0, it indicates that no CC-ALF is used for the chroma components corresponding to all the CTUs in the current slice.

In some embodiments, if the flag bit indicating whether CC-ALF is used at the slice level is 1, it may further indicate that CC-ALF is used for chroma components corresponding to all the CTUs in the current slice.

If the flag bit indicating whether CC-ALF is used at the slice level indicates that CC-ALF is not used for the chroma components corresponding to all the CTUs in the current slice, or that CC-ALF is used for the chroma components corresponding to all the CTUs in the current slice, the encoder does not need to encode the flag bit indicating whether or not CC-ALF is used at the CTU level, and the decoder does not need to perform decoding to obtain the same.

3. When CC-ALF needs to be used, an index of an APS needs to be indicated, and a classification method used for a corresponding chroma component is indicated by using a classification method flag bit in the APS corresponding to the index. For example, if the classification method flag bit is 0, it indicates that the existing classification method in the related CC-ALF technology is to be used. If the classification method flag bit is 1, it indicates that the classification method provided in the example embodiments is to be used.

4. If the classification method flag bit in the APS is 0, it indicates that the existing classification method in the related CC-ALF technology needs to be used, and further, related parameters at each level may be transmitted according to a design that already exists in the related CC-ALF technology.

5. If the classification method flag bit in the APS is 1, it indicates that the classification method provided in the example embodiments needs to be used, and therefore, related parameters at all levels may be transmitted in the manner described in the foregoing embodiments.

For each chroma component, an encoder may perform a process of selection decision-making for a classification method for CC-ALF. Descriptions of an exemplary decision process are provided in the following:

A) According to the existing classification method in the related CC-ALF technology, CC-ALF decision-making is performed on all CTUs in the current slice to obtain a CC-ALF optimal rate distortion cost of the current slice.

B) According to the classification method proposed in the example embodiments, CC-ALF decision-making is performed on all CTUs in the current slice to obtain an optimal rate distortion cost of the current slice in the classification method.

C) Rate distortion costs at two slice levels are compared, and the classification method flag bit in the APS is set to a classification method in which the indication rate distortion cost is relatively small.

The Classification Method Proposed in the Example Embodiments and the Existing Classification Method in the Related CC-ALF Technology are Both Used, and the Classification Methods are Jointly Specified for Two Chroma Components:

In some embodiments, when the classification method proposed in the example embodiments and the existing classification method in the related CC-ALF technology are both used in CC-ALF of the chroma component, two chroma components Cb and Cr may share a classification method flag bit in one APS, so as to use the same classification method for all samples of the two chroma components in the current frame, and perform CC-ALF selection decision-making and related parameter transmission for the two chroma components Cb and Cr.

Specifically, for the two chroma components, CC-ALF related parameters that need to be transmitted by the encoder may include the following:

1. Flag bit indicating whether or not CC-ALF is used (On/Off) at the CTU level. For example, if the flag bit is 1, it indicates that two chroma components in a current CTU are filtered by using CC-ALF (a specific classification method used in filtering may be the classification method proposed in the example embodiments, or may be the existing classification method in the related CC-ALF technology; and specifically, a specific classification method needs to be further indicated by using the flag bit in the APS). If the flag bit is 0, it indicates that two chroma components in the current CTU do not use CC-ALF filtering.

2. Flag bit indicating whether or not CC-ALF is used at the slice level. For example, if the flag bit is 1, it indicates that two chroma components of at least one CTU in a current slice use CC-ALF (similarly, a specific classification method used in filtering may be the classification method proposed in the example embodiments, or may be the existing classification method in the related CC-ALF technology; and specifically, a specific classification method needs to be further indicated by using the flag bit in the APS). If the flag bit is 0, it indicates that two chroma components of all the CTUs in the current slice do not use CC-ALF.

In some embodiments, if the flag bit indicating whether CC-ALF is used at the slice level is 1, it may further indicate that CC-ALF is used for two chroma components of all the CTUs in the current slice.

If the flag bit indicating whether CC-ALF is used at the slice level indicates that CC-ALF is not used for two chroma components of all the CTUs in the current slice, or that CC-ALF is used for the two chroma components of all the CTUs in the current slice, the encoder does not need to encode the flag bit indicating whether or not CC-ALF is used at the CTU level, and the decoder does not need to perform decoding to obtain the same.

3. When CC-ALF needs to be used, an index of one APS needs to be indicated, and one classification method flag bit in the APS corresponding to the index may be used for indicating a classification manner of two chroma components. For example, if the classification method flag bit is 1, it indicates that the classification method provided in the example embodiments is used for all samples of the two chroma components. If the classification method flag bit is 0, it indicates that the existing classification method in the related CC-ALF technology is used for all samples of the two chroma components.

4. If the classification method flag bit in the APS is 0, it indicates that the existing classification method in the related CC-ALF technology is used for all samples of the two chroma components, and further, related parameters at each level may be transmitted according to a design that already exists in the related CC-ALF technology.

5. If the classification method flag bit in the APS is 1, it indicates that the classification method provided in the example embodiments is used for all samples of the two chroma components, and therefore, related parameters at all levels may be transmitted in the manner described in the foregoing embodiment.

For two chroma components, an encoder may perform a process of selection decision-making for a classification method for CC-ALF. Descriptions of an exemplary decision process are provided in the following:

A) Respectively perform, on the two chroma components Cb and Cr, CC-ALF decision-making for all CTUs in the current slice according to the existing classification method in the related CC-ALF technology, to obtain a total CC-ALF optimal rate distortion cost of the two chroma components in the current slice.

B) Respectively perform, on the two chroma components Cb and Cr, CC-ALF decision-making for all CTUs in the current slice according to the classification method proposed in the example embodiments, to obtain a total CC-ALF optimal rate distortion cost of the two chroma components in the current slice in the current classification method.

C) The total rate distortion costs of the two chroma components at two slice levels are compared, and the classification flag bit in the APS is set as a classification method in which the indication rate distortion cost is relatively small.

In the foregoing two embodiments, the flag bit indicating whether or not the CTU level uses CC-ALF, the flag bit indicating whether or not the slice level uses CC-ALF, and the classification method flag bit in the APS, may be one flag bit set for each chroma component (i.e., there are two CTU level flag bits, two slice level flag bits, and two APS level flag bits respectively corresponding to two chroma components), or may be only one flag bit set for both chroma components (i.e., there is one CTU level flag bit, one slice level flag bit, and one APS level flag bit corresponding to the two chroma components).

In some embodiments, one APS level flag bit may be set to correspond to two chroma components, and two slice level flag bits and two CTU level flag bits may be set. Namely, there are two CTU level flag bits and two slice level flag bits, so as to respectively correspond to two chroma components.

It can also be understood that, one APS level flag bit may be set to correspond to two chroma components, one slice level flag bit may be set to correspond to two chroma components, and two CTU level flag bits may be set. Namely, there are two CTU level flag bits respectively correspond to two chroma components.

In the foregoing example embodiments, a CTU-level block may be used as an example for description purpose. In some embodiments, a block of another size may be processed. For example, in addition to a CTU-level block of a size 128×128, the block may also be 64×64 or another smaller size block.

In some embodiments, a size of a block-level unit for performing block-level CC-ALF filtering selection may be specified at both the encoder and the decoder. In this way, the size information of the block-level unit does not need to be transmitted. In this regard, one flag bit needs to be transmitted for each block-level unit to indicate whether a corresponding block unit uses CC-ALF.

In some embodiments, the encoder may select whether to use block-level CC-ALF filtering, and write a size of a corresponding block-level unit into a bitstream, and the decoder may parse the bitstream to obtain the size information of the corresponding block-level unit. The size information may be written in a sequence parameter set (SPS), a picture parameter set (PPS), a picture header, and/or a slice header. In addition, one flag bit needs to be transmitted for each block-level unit to indicate whether or not a corresponding block unit uses CC-ALF.

It can be understood that, although the operations are displayed sequentially according to the indication of the arrows in the flowcharts of the example embodiments, these operations are not necessarily performed sequentially according to the sequence indicated by the arrows. Unless otherwise explicitly specified herein, execution of the operations is not strictly limited to any displayed sequences, and the operations may be performed in other suitable sequences. Moreover, at least some of the operations in one or more embodiments may include a plurality of operations or a plurality of stages. The operations or stages are not necessarily performed at the same moment, and may be performed at different moments. Execution of the operations or stages is not necessarily sequentially performed, but may be performed alternately with other operations or at least some of operations or stages.

The following describes the example apparatuses which may be configured to perform one or more operations in the method described in the foregoing embodiments.

Figure 10:
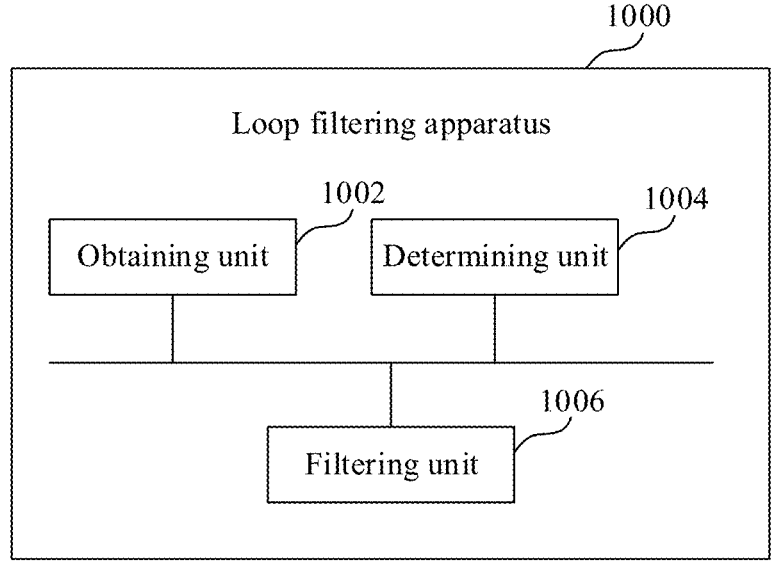
FIG. 10 illustrates a block diagram of an example loop filtering apparatus, according to some embodiments.

FIG. 10 illustrates a block diagram of an example loop filtering apparatus according to some embodiments. The loop filtering apparatus may be disposed or be deployed in a video encoding device and/or a video decoding device. Further, the loop filtering apparatus may be configured to perform one or more operations in one or more methods described above in the foregoing embodiments.

Referring to FIG. 10, the loop filtering apparatus 1000 may include: an obtaining unit 1002, a determining unit 1004, and a filtering unit 1006. It can be understood that, in some embodiments, at least a portion of the units 1002-1006 may be combined with each other and/or may be configured to perform one or more operations of each other. For instance, the obtaining unit 1002 may be combined with the determining unit 1004 and/or may be configured to perform one or more operations of the determining unit 1004, and the like.

The obtaining unit 1002 may be configured to obtain block classification information of a luma component in a video image frame. For instance, the obtaining unit 1002 may obtain the block classification information of the luma component when adaptive loop filtering (ALF) is performed on the luma component. The determining unit 1004 may be configured to determine, based on the block classification information of the luma component, block classification information of a chroma component in the video image frame. For instance, the determining unit 1004 may determine the block classification information of the chroma component when cross-component adaptive loop filtering (CC-ALF) is performed on the chroma component. The filtering unit 1006 may be configured to select, based on the block classification information of the chroma component, a filter coefficient to perform CC-ALF processing on the chroma component.

In some embodiments, the determining unit 1004 may be configured to: use a classification result of a subblock when ALF is performed on the luma component as a classification result of a block of a same size when CC-ALF is performed on the chroma component.

In some embodiments, the determining unit 1004 may be configured to: use a classification result and a corresponding geometric transform type of a subblock when ALF is performed on the luma component as a classification result and a geometric transform type of a block of a same size when CC-ALF is performed on the chroma component.

In some embodiments, the determining unit 1004 may be further configured to: determine, based on a merging result of various types of filters when ALF is performed on the luma component, a merging result of various types of filters when CC-ALF is performed on the chroma component.

In some embodiments, the determining unit 1004 may be further configured to: determine, based on a rate distortion cost of performing filter merging when the ALF process is performed on the luma component and a rate distortion cost of performing filter merging when the CC-ALF process is performed on the chroma component, one or more merging results of various types of filters when ALF is performed on the luma component and when CC-ALF is performed on the chroma component.

In some embodiments, the determining unit 1004 may be further configured to: determine, based on a quantity of filters determined when ALF is performed on the luma component, a quantity of available filters when CC-ALF is performed on the chroma component.

Figure 11:
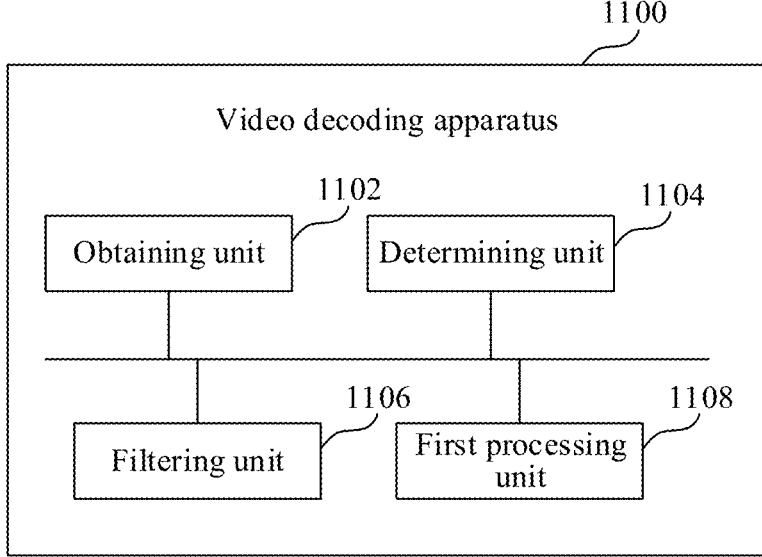
FIG. 11 illustrates a block diagram of an example video decoding apparatus, according to some embodiments.

FIG. 11 illustrates a block diagram of an example video decoding apparatus according to some embodiments. The video decoding apparatus may be disposed in a video decoding device. Further, the video decoding apparatus may include one or more components of the loop filtering apparatus in FIG. 10, and/or may be configured to perform one or more operations of said loop filtering apparatus. Furthermore, the video decoding apparatus may also be configured to perform one or more operations in one or more methods described above in the foregoing embodiments.

Referring to FIG. 11, the video decoding apparatus 1100 may include: an obtaining unit 1102, a determining unit 1104, a filtering unit 1106, and a first processing unit 1108. It can be understood that, in some embodiments, at least a portion of the units 1102-1108 may be combined with each other and/or may be configured to perform one or more operations of each other. For instance, the obtaining unit 1102 may be combined with the determining unit 1104 and/or may be configured to perform one or more operations of the determining unit 1104, and the like.

The obtaining unit 1102 may be configured to obtain block classification information of a luma component in a video image frame. For instance, the obtaining unit 1102 may obtain the block classification information of the luma component when adaptive loop filtering (ALF) is performed on the luma component. The determining unit 1104 may be configured to determine, based on the block classification information of the luma component, block classification information of a chroma component in the video image frame. For instance, the determining unit 1104 may be configured to determine the block classification information of the chroma component when cross-component adaptive loop filtering (CC-ALF) is performed on the chroma component. The filtering unit 1106 may be configured to select, based on the block classification information of the chroma component, a filter coefficient to perform CC-ALF processing on the chroma component. The first processing unit 1108 may be configured to perform decoding processing on a video bitstream according to an ALF processing result of the luma component and a CC-ALF processing result of the chroma component.

In some embodiments, the video decoding apparatus 1100 may further include a first decoding unit. The first decoding unit may be configured to: before determining the block classification information of the chroma component, decode the video bitstream to obtain a first flag bit corresponding to a current slice, wherein a value of the first flag bit may be used for indicating whether a chroma component of a target block in the current slice uses the CC-ALF processing.

In some embodiments, if the value of the first flag bit is a first value, it indicates that chroma components of at least a portion of target blocks in the current slice use the CC-ALF processing, or indicates that chroma components of all target blocks in the current slice use the CC-ALF processing; or if the value of the first flag bit is a second value, it indicates that chroma components of all target blocks in the current slice do not use the CC-ALF processing.

In some embodiments, the first decoding unit may be further configured to: decode the video bitstream to obtain a second flag bit corresponding to each target block included in the current slice, if the value of the first flag bit indicates that chroma components of at least a portion of target blocks in the current slice use the CC-ALF processing. The value of the second flag bit may be used for indicating whether a chroma component of a corresponding target block uses the CC-ALF processing.

In some embodiments, two chroma components of the target block may respectively correspond to one second flag bit, and a value of each second flag bit may be used for indicating whether a corresponding chroma component in the target block uses the CC-ALF processing.

In some embodiments, two chroma components of the target block may correspond to a same second flag bit, and a value of the same second flag bit may be used for indicating whether the two chroma components of the target block use the CC-ALF processing.

In some embodiments, the first decoding unit may be further configured to: decode the video bitstream to obtain an adaptive parameter set; decode the video bitstream to obtain an index of an adaptive parameter set corresponding to the current slice, if the value of the first flag bit indicates that a chroma component of at least one target block in the current slice uses the CC-ALF processing; select a filter coefficient from the adaptive parameter set corresponding to the index of the adaptive parameter set to perform filtering processing on the chroma component of the target block.

In some embodiments, the two chroma components of the current slice may respectively correspond to one first flag bit, and a value of each first flag bit may be used for indicating whether the corresponding chroma component of the current slice uses the CC-ALF processing.

In some embodiments, the two chroma components of the current slice may correspond to a same first flag bit, and a value of the same first flag bit may be used for indicating whether the current slice uses the CC-ALF processing for the two chroma components.

In some embodiments, the video decoding apparatus 1100 may further include a second decoding unit. The second decoding unit may be configured to: before determining the block classification information of the chroma component, decode the video bitstream to obtain an adaptive parameter set and a third flag bit corresponding to a current slice A value of the third flag bit may be used for indicating whether CC-ALF processing is performed on a chroma component of a target block in the current slice; decode the video bitstream to obtain an index of an adaptive parameter set corresponding to the current slice, if the value of the third flag bit indicates that CC-ALF processing needs to be performed on the chroma component of the target block in the current slice; and obtain, from the adaptive parameter set corresponding to the index of the adaptive parameter set, a fourth flag bit corresponding to a chroma component of the current slice. A value of the fourth flag bit may be used for indicating a classification policy used when CC-ALF processing is performed on the chroma component of the current slice, wherein the classification policy may include: determining, based on the block classification information of the luma component, the block classification information of the chroma component; or another classification policy.

In some embodiments, if the value of the fourth flag bit corresponding to the chroma component of the current slice is a first value, it indicates that a classification policy used when CC-ALF processing is performed on the chroma component of the current slice includes determining, according to the block classification information of the luma component, the block classification information of the chroma component; if the value of the fourth flag bit corresponding to the chroma component of the current slice is a second value, it indicates that a classification policy used when CC-ALF processing is performed on the chroma component of the current slice is the another classification policy.

In some embodiments, the second decoding unit may be further configured to: decode the video bitstream to obtain a fifth flag bit corresponding to each target block included in the current slice, if the value of the third flag bit indicates that CC-ALF processing needs to be performed on chroma components of some target blocks in the current slice. A value of the fifth flag bit may be used for indicating whether CC-ALF processing is to be performed on a chroma component of a corresponding target block.

In some embodiments, two chroma components of the current slice may respectively correspond to one fourth flag bit, and a value of each fourth flag bit may be used for indicating a classification policy used when CC-ALF processing is performed on a corresponding chroma component of the current slice.

In some embodiments, two chroma components of the current slice may correspond to a same fourth flag bit, and a value of the same fourth flag bit may be used for indicating a classification policy used when CC-ALF processing is performed on the two chroma components of the current slice.

In some embodiments, the first processing unit 1108 may be further configured to determine size information of the target block according to a preset size.

In some embodiments, the first processing unit 1108 may be further configured to: decode a sequence parameter set, an image parameter set, an image header, and/or a slice header of the video bitstream to obtain size information of the target block.

In some embodiments, the target block may include: a coding tree unit or a block having a size smaller than that of the coding tree unit.

Figure 12:
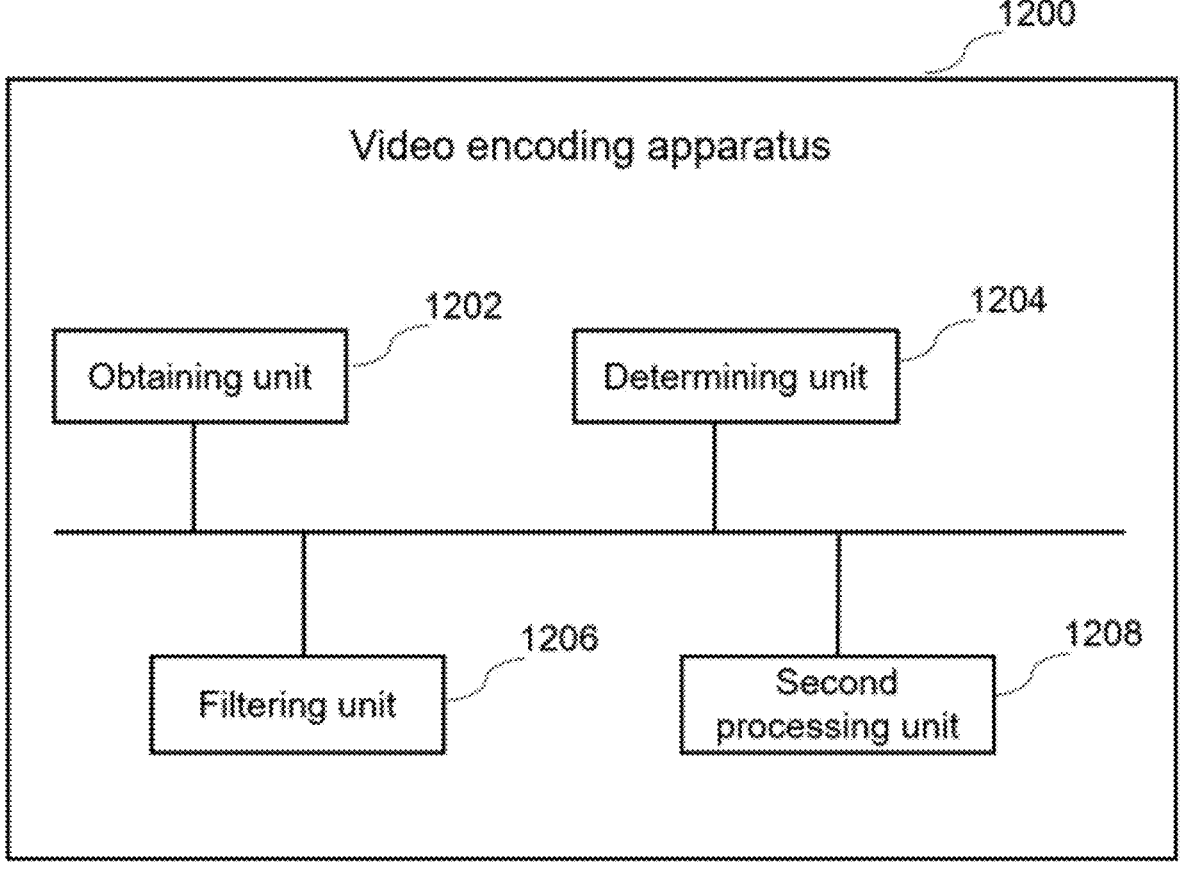
FIG. 12 illustrates a block diagram of an example video coding apparatus, according to some embodiments.

FIG. 12 illustrates a block diagram of an example video encoding apparatus according to some embodiments. The video encoding apparatus may be disposed in a video coding device. Further, the video encoding apparatus may include one or more components of the loop filtering apparatus in FIG. 10, and/or may be configured to perform one or more operations of said loop filtering apparatus. Furthermore, the video encoding apparatus may also be configured to perform one or more operations in one or more methods described above in the foregoing embodiments Referring to FIG. 12, the video encoding apparatus 1200 may include: an obtaining unit 1202, a determining unit 1204, a filtering unit 1206, and a second processing unit 1208. It can be understood that, in some embodiments, at least a portion of the units 1202-1208 may be combined with each other and/or may be configured to perform one or more operations of each other. For instance, the obtaining unit 1202 may be combined with the determining unit 1204 and/or may be configured to perform one or more operations of the determining unit 1204, and the like.

The obtaining unit 1202 may be configured to obtain block classification information of a luma component in a video image frame. For instance, the obtaining unit 1202 may obtain the block classification information of the luma component when adaptive loop filtering (ALF) is performed on the luma component. The determining unit 1204 may be configured to determine, based on the block classification information of the luma component, block classification information of a chroma component in the video image frame. For instance, the determining unit 1204 may be configured to determine the block classification information of the chroma component when cross-component adaptive loop filtering (CC-ALF) is performed on the chroma component. The filtering unit 1206 may be configured to select, based on the block classification information of the chroma component, a filter coefficient to perform CC-ALF processing on the chroma component. The second processing unit 1208 may be configured to perform encoding processing on the video image frame according to an ALF processing result of the luma component and a CC-ALF processing result of the chroma component, to obtain a video bitstream.

In some embodiments, the video encoding apparatus 1200 may further include a first encoding unit The first encoding unit may be configured to encode, in the video bitstream, a first flag bit corresponding to a current slice of the video image frame. A value of the first flag bit may be used for indicating whether a chroma component of a target block in the current slice uses the CC-ALF processing.

In some embodiments, the first encoding unit may be further configured to: encode, in the video bitstream, a second flag bit corresponding to each target block included in the current slice, if the value of the first flag bit indicates that chroma components of some target blocks in the current slice use the CC-ALF processing. A value of the second flag bit may be used for indicating whether a chroma component of a corresponding target block uses the CC-ALF processing.

In some embodiments, the first encoding unit is further configured to: before encoding the second flag bit, calculate a first rate distortion cost of a chroma component of each target block if the CC-ALF processing is used, wherein when the CC-ALF processing is performed on the chroma component of each target block, a CC-ALF filter may be selected based on the block classification information of the luma component; calculate a second rate distortion cost of the chroma component of each target block if CC-ALF processing is not performed; and determine, based on the first rate distortion cost and the second rate distortion cost, whether the chroma component of each target block uses the CC-ALF processing.

In some embodiments, the video encoding apparatus 1200 may further include a second encoding unit. The second encoding unit may be configured to encode, in the video bitstream, a third flag bit corresponding to the current slice. A value of the third flag bit may be used for indicating whether CC-ALF processing is performed on the chroma component of the target block in the current slice; if CC-ALF processing needs to be performed on the chroma component of the target block in the current slice, encode, in the video bitstream, an index of a corresponding adaptive parameter set; and encode, in the adaptive set corresponding to the index of the adaptive parameter set, a fourth flag bit corresponding to a chroma component of the current slice. A value of the fourth flag bit may be used for indicating a classification policy used when CC-ALF processing is performed on the chroma component of the current slice, wherein the classification policy may include: determining, based on the block classification information of the luma component, the block classification information of the chroma component; or another classification policy.

In some embodiments, the second encoding unit may be further configured to: encode, in the video bitstream, a fifth flag bit corresponding to each target block included in the current slice, if the value of the third flag bit indicates that CC-ALF processing needs to be performed on chroma components of some target blocks in the current slice. A value of the fifth flag bit may be used for indicating whether CC-ALF processing is to be performed on a chroma component of a corresponding target block.

In some embodiments, the second encoding unit may be further configured to: before encoding the fourth flag bit corresponding to the chroma component of the current slice in the adaptive set corresponding to the index of the adaptive parameter set, calculate third rate distortion costs of chroma components of all target blocks in the current slice when CC-ALF processing is performed on a target classification policy, wherein the target classification policy may include determining, based on the block classification information of the luma component, the block classification information of the chroma component; calculate fourth rate distortion costs of the chroma components of all the target blocks in the current slice when CC-ALF processing is performed by using the another classification policy; and determine, based on the third rate distortion costs and the fourth rate distortion costs, a classification policy used when CC-ALF processing is performed on the chroma component of the current slice.

In some embodiments, the second processing unit 1208 may be further configured to: determine size information of the target block according to a preset size.

In some embodiments, the second processing unit 1208 may be further configured to encode size information of the target block in a sequence parameter set, an image parameter set, an image header, and/or a slice header of the video bitstream.

In some embodiments, an electronic device may be provided. The electronic device may include a memory and a processor, the memory may store computer readable instructions, and the processor may implements or may be configured to perform one or more operations of one or more methods described in any one of the foregoing embodiments when executing the computer readable instructions.

Figure 13:
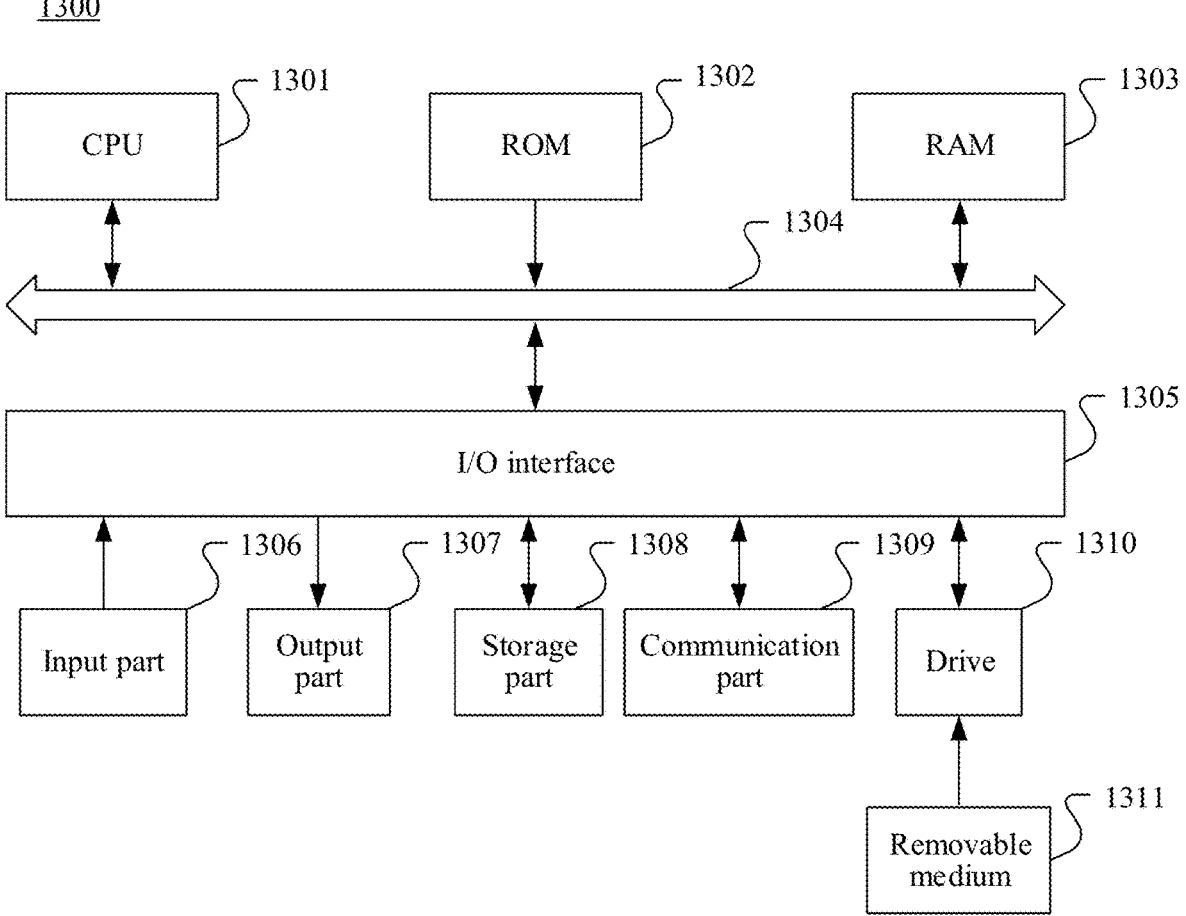
FIG. 13 illustrates a schematic diagram of an example computer system adapted to implement an electronic device, according to some embodiments.

FIG. 13 illustrates a schematic structural diagram of an example computer system adapted to implement an electronic device according to some embodiments.

A computer system 1300 of the electronic device shown in FIG. 13 is merely an example, and does not constitute any limitation on functions and use ranges of the embodiments of the present disclosure.

As shown in FIG. 13, the computer system 1300 may include a central processing unit (CPU) 1301, which may perform various suitable actions and processing based on a program stored in a read-only memory (ROM) 1302 or a program loaded from a storage part 1308 into a random access memory (RAM) 1303. For example, the CPU 1301 may be configured to perform one or more operations of the method(s) described in the foregoing embodiments. The RAM 1303 may further store various programs and data required for operating the system. The CPU 1301, the ROM 1302, and the RAM 1303 may be connected to each other through a bus 1304. An input/output (I/O) interface 1305 may also be connected to the bus 1304.

Further, the following components may be connected to the I/O interface 1305: an input part 1306 which may include a keyboard, a mouse, and the like; an output part 1307 which may include, for example, a cathode ray tube (CRT), a liquid crystal display (LCD), a speaker, and the like; a storage part 1308 which may include a hard disk and the like; and a communication part 1309 which may include a network interface card such as a local area network (LAN) card or a modem. The communication part 1309 may perform communication processing by using a network such as the Internet. A driver 1310 may also be connected to the I/O interface 1305 as required. A removable medium 1311, such as a magnetic disk, an optical disc, a magneto-optical disk, or a semiconductor memory, may be installed on the drive 1310 as required, so that a computer program read from the removable medium may be installed into the storage part 1308 as required.

Particularly, according to some embodiments, the processes or operations described herein by referring to the flowcharts may be implemented as computer software programs. For example, a computer program product may be provided, where the computer program product may include a computer readable instructions, and the computer readable instructions may be executed by a processor to implement one or more operations in the method(s) described in any one of the foregoing embodiments. In this regard, by using the communication part 1309, the computer readable instructions may be downloaded and installed from a network, and/or may be installed from the removable medium 1311.

A related unit described in the example embodiments of the present disclosure may be implemented in a software form, or may be implemented in a hardware form, and the unit described herein can also be set in a processor. Names of the units do not constitute a limitation on the units in a specific case.

In some embodiments, a computer readable medium may be provided. The computer readable medium may be included in any of the electronic devices described in the foregoing embodiment. The computer readable medium may alternatively exist separately and not be assembled into the electronic device. The computer readable medium may store or carry one or more computer readable instructions, or may store or carry one or more computer program code. When the one or more computer readable instructions/computer program codes are executed by the electronic device, the electronic device may implement one or more operations of the method(s) described in any one of the foregoing embodiments. Although a plurality of modules or units of a device configured to perform actions are discussed in the foregoing embodiments, such configuration is not mandatory. In fact, in some implementations, the features and functions of two or more modules or units described above may be implemented in one module or unit. On the contrary, the features and functions of one module or unit described above may be further divided to or be embodied by a plurality of modules or units.

According to the foregoing descriptions of the example embodiments, a person skilled in the art may readily understand that the exemplary implementations described herein may be implemented by using software, or may be implemented by combining software and necessary hardware. Therefore, the example embodiments may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the example embodiments of the present disclosure.

Technical features of the foregoing embodiments may be randomly merged. For conciseness, not all possible combinations of the technical features in the foregoing embodiments are described. However, the combinations of these technical features shall be considered as falling within the scope of the present disclosure provided that no conflict exists.

The foregoing embodiments merely express several example implementations of the present disclosure. The descriptions thereof are relatively specific and detailed, but are not to be considered as limitations to the scope of the present disclosure. For a person of ordinary skill in the art, several modifications and improvements can be made without departing from scope of the present disclosure. These modifications and improvements belong to the scope of the present disclosure.

What is claimed is:

1. A method performed by a video encoding device or a video decoding device, the method comprising:

obtaining block classification information of a luma component in a video image frame, the block classification information of the luma component including a sub-block level classification result that indicates that two or more subblocks belong to a different classification categories and a merging result that indicates that different classification categories share first filter coefficients for adaptive loop filtering (ALF) performed on the luma component;

determining, based on the block classification information of the luma component, block classification information of a chroma component in the video image frame;

determining, based on the merging result of the luma component, a merging result of the chroma component; and selecting, based on the block classification information of the chroma component and the merging result of the chroma component, second filter coefficients to perform cross-component adaptive loop filtering (CC-ALF) processing on the chroma component.

2. The method according to claim 1, wherein the obtaining the block classification information of the luma component is performed when ALF is performed on the luma component, and wherein the determining the block classification information of the chroma component is performed when CC-ALF is performed on the chroma component.

3. The method according to claim 2, wherein the determining comprises:

using a classification result of a subblock when ALF is performed on the luma component as a classification result of a block of a same size when CC-ALF is performed on the chroma component.

4. The method according to claim 2, wherein the determining comprises:

using a classification result and a corresponding geometric transform type of a subblock when ALF is performed on the luma component as a classification result and a geometric transform type of a block of a same size when CC-ALF is performed on the chroma component.

5. The method according to claim 1, wherein the second filter coefficients correspond to a diamond-shaped filter.

6. The method according to claim 2, further comprising:

determining, based on a rate distortion cost of performing filter merging when an ALF process is performed on the luma component and a rate distortion cost of performing filter merging when a CC-ALF process is performed on the chroma component, one or more merging results when ALF is performed on the luma component and when CC-ALF is performed on the chroma component.

7. The method according to claim 2, further comprising:

determining, based on a quantity of filters determined when ALF is performed on the luma component, a quantity of available filters when CC-ALF is performed on the chroma component.

8. The method according to claim 1, further comprising:

performing decoding processing on a video bitstream according to an ALF processing result of the luma component and a CC-ALF processing result of the chroma component.

9. The method according to claim 8, the method further comprising:

decoding the video bitstream to obtain a first flag bit corresponding to a current slice, a value of the first flag bit being used for indicating whether a chroma component of a target block in the current slice uses the cross-component adaptive loop filtering processing.

10. The method according to claim 9, wherein:

a first value of the first flag bit indicates that chroma components of some target blocks in the current slice use the cross-component adaptive loop filtering processing, or indicates that chroma components of all target blocks in the current slice use the cross-component adaptive loop filtering processing; or a second value of the first flag bit indicates that chroma components of all target blocks in the current slice do not use the cross-component adaptive loop filtering processing.

11. The method according to claim 9, further comprising:

when the value of the first flag bit indicates that chroma components of some target blocks in the current slice use the cross-component adaptive loop filtering processing, determining a second flag bit corresponding to each target block comprised in the current slice, the value of the second flag bit being used for indicating whether a chroma component of a corresponding target block uses the cross-component adaptive loop filtering processing.

12. The method according to claim 1, further comprising:

performing encoding processing on the video image frame according to an ALF processing result of the luma component and a CC-ALF processing result of the chroma component, to obtain a video bitstream.

13. The method according to claim 12, further comprising:

encoding, in the video bitstream, a first flag bit corresponding to a current slice of the video image frame, wherein a value of the first flag bit is used for indicating whether a chroma component of a target block in the current slice uses the CC-ALF processing.

14. An apparatus comprising:

at least one memory configured to store computer program code; and at least one processor configured to access the at least one memory and execute the computer program code, the computer program code including:

obtaining code configured to cause the at least one processor to obtain block classification information of a luma component in a video image frame, the block classification information of the luma component including a subblock level classification result that indicates that two or more subblocks belong to different classification categories, and a merging result that indicates that different classification categories share first filter coefficients for adaptive loop filtering (ALF) performed on the luma component;

first determining code configured to cause the at least one processor to determine, based on the block classification information of the luma component, block classification information of a chroma component in the video image frame;

second determining code configured to cause the at least one processor to determine, based on the merging result of the luma component, a merging result of the chroma component; and selecting code configured to cause the at least one processor to select, based on the block classification information of the chroma component and the merging result of the chroma component, a filter coefficient to perform cross-component adaptive loop filtering (CC-ALF) processing on the chroma component.

15. The apparatus according to claim 14, wherein:

the obtaining code is configured to cause the at least one processor to obtain the block classification information of the luma component when adaptive loop filtering (ALF) is performed on the luma component; and the first determining code is configured to cause the at least one processor to determine the block classification information of the chroma component when CC-ALF is performed on the chroma component.

16. The apparatus according to claim 14, wherein the first determining code is configured to cause the at least one processor to determine the block classification information of the chroma component by using a classification result of a subblock when ALF is performed on the luma component as a classification result of a block of a same size when CC-ALF is performed on the chroma component.

17. The apparatus according to claim 14, wherein the first determining code is configured to cause the at least one processor to determine the block classification information of the chroma component by using a classification result and a corresponding geometric transform type of a subblock when ALF is performed on the luma component as a classification result and a geometric transform type of a block of a same size when CC-ALF is performed on the chroma component.

18. The apparatus according to claim 14, wherein the second filter coefficients correspond to a diamond-shaped filter.

19. The apparatus according to claim 14, wherein the second determining code is configured to cause the at least one processor determine, based on a rate distortion cost of performing filter merging when an ALF process is performed on the luma component and a rate distortion cost of performing filter merging when a CC-ALF process is performed on the chroma component, one or more merging results when ALF is performed on the luma component and when CC-ALF is performed on the chroma component.

20. A non-transitory computer readable medium storing computer program code, the program code configured to cause at least one processor to:

obtain block classification information of a luma component in a video image frame, the block classification information of the luma component including a subblock level classification result that indicates that two or more subblocks belong to a different classification category, and a merging result that indicates that different classification categories share first filter coefficients for adaptive loop filtering (ALF) performed on the luma component;

determine, based on the block classification information of the luma component, block classification information of a chroma component in the video image frame;

determine, based on the merging result of the luma component, a merging result of the chroma component; and select, based on the block classification information of the chroma component, a filter coefficient to perform cross-component adaptive loop filtering (CC-ALF) processing on the chroma component.

* * * * *